United States Patent
Ito

(10) Patent No.: US 7,365,788 B2
(45) Date of Patent: Apr. 29, 2008

(54) IMAGER APPARATUS

(75) Inventor: Junichi Ito, Fuchu (JP)

(73) Assignee: Olympus Corporation, Tokyo (JP)

( * ) Notice: Subject to any disclaimer, the term of this patent is extended or adjusted under 35 U.S.C. 154(b) by 732 days.

(21) Appl. No.: 10/771,705

(22) Filed: Feb. 4, 2004

(65) Prior Publication Data

US 2004/0227837 A1  Nov. 18, 2004

(30) Foreign Application Priority Data

| Feb. 7, 2003 | (JP) | ............................. 2003-030876 |
| Feb. 18, 2003 | (JP) | ............................. 2003-039531 |
| Feb. 28, 2003 | (JP) | ............................. 2003-054642 |
| Mar. 3, 2003 | (JP) | ............................. 2003-056216 |

(51) Int. Cl.
*G02B 13/16* (2006.01)
*H04N 5/225* (2006.01)

(52) U.S. Cl. ........................ 348/335; 348/340; 348/374

(58) Field of Classification Search ................ 348/335, 348/340, 351, 333.03, 222.1, 354; 396/52, 396/55; 359/507, 554, 819; 455/41.2

See application file for complete search history.

(56) References Cited

U.S. PATENT DOCUMENTS

| 4,387,973 | A | | 6/1983 | Martin |
| 4,841,387 | A | | 6/1989 | Rindfuss |
| 4,920,420 | A | * | 4/1990 | Sano et al. .................. 348/351 |
| 5,170,288 | A | | 12/1992 | Imaizumi et al. |
| 5,633,756 | A | * | 5/1997 | Kaneda et al. .............. 359/554 |
| 5,910,700 | A | | 6/1999 | Crotzer |
| 6,078,438 | A | | 6/2000 | Shibata et al. |
| 6,163,340 | A | | 12/2000 | Yasuda |
| 6,590,613 | B2 | | 7/2003 | Yasuda |
| 7,006,138 | B2 | * | 2/2006 | Kawai ......................... 348/340 |
| 7,095,982 | B2 | * | 8/2006 | Mizutani .................... 455/41.2 |
| 2001/0053288 | A1 | | 12/2001 | Ito et al. |
| 2002/0171751 | A1 | | 11/2002 | Ohkawara |
| 2003/0146980 | A1 | | 8/2003 | Shimada |
| 2003/0202114 | A1 | * | 10/2003 | Takizawa et al. ........... 348/335 |
| 2003/0214588 | A1 | | 11/2003 | Takizawa et al. |
| 2003/0214599 | A1 | | 11/2003 | Ito et al. |
| 2003/0218685 | A1 | | 11/2003 | Kawai |
| 2003/0227559 | A1 | * | 12/2003 | Rouvinen et al. ........... 348/335 |
| 2003/0227560 | A1 | * | 12/2003 | Mattsson et al. ........... 348/335 |
| 2004/0047625 | A1 | | 3/2004 | Ito et al. |
| 2004/0090549 | A1 | | 5/2004 | Takizawa et al. |
| 2004/0169761 | A1 | | 9/2004 | Kawai et al. |
| 2004/0227837 | A1 | | 11/2004 | Ito |
| 2004/0263669 | A1 | | 12/2004 | Kobayashi |

(Continued)

FOREIGN PATENT DOCUMENTS

JP  57-078032  5/1982

(Continued)

*Primary Examiner*—Ngoc-Yen Vu
*Assistant Examiner*—Kent Wang
(74) *Attorney, Agent, or Firm*—Volpe & Koenig PC

(57) ABSTRACT

In an imager apparatus, an optical member protecting an imaging element is vibrated. Dust is thereby removed from the optical member. A vibration member can vibrate the optical member in a plurality of conditions. A photographing-mode setting unit sets a photographing mode. A vibration-condition changes unit changes the condition in which the vibration member vibrates the optical member, in accordance with the photographing mode set by the photographing-mode setting unit.

2 Claims, 19 Drawing Sheets

U.S. PATENT DOCUMENTS

2005/0088563 A1  4/2005  Ito et al.

FOREIGN PATENT DOCUMENTS

| JP | 62-165127 | 7/1987 |
| JP | 01-230016 | 9/1989 |
| JP | 03-244281 | 10/1991 |
| JP | 05-213286 | 8/1993 |
| JP | 07-151946 | * 12/1994 |
| JP | 07151946 | 6/1995 |
| JP | H07-151946 A | * 6/1995 |
| JP | 07-322153 | 12/1995 |
| JP | 0879633 | 3/1996 |
| JP | 09-130654 | 5/1997 |
| JP | 2000-029132 | 1/2000 |
| JP | 2000-330054 | 11/2000 |
| JP | 2001-211414 | 8/2001 |
| JP | 2001298640 | 10/2001 |
| JP | 2001-359287 | 12/2001 |
| JP | 2002204379 | 7/2002 |
| JP | 2002229110 | 8/2002 |

* cited by examiner

IMAGER APPARATUS

CROSS-REFERENCE TO RELATED APPLICATIONS

This application is based upon and claims the benefit of priority from prior Japanese Patent Applications No. 2003-030876, filed Feb. 7, 2003; 2003-039531, filed Feb. 18, 2003; 2003-054642, filed Feb. 28, 2003; and 2003-056216., filed Mar. 3, 2003, the entire contents of all of which are incorporated herein by reference.

BACKGROUND OF THE INVENTION

1. Field of the Invention

The present invention relates to an imager apparatus.

2. Description of the Related Art

Hitherto, a technique of shielding dust from optical apparatuses has been proposed. The technique consists in vibrating a protective glass plate (glass dust shield) to remove dust from the glass dust shield. An example of this technique is disclosed in, for example, Jpn. Pat. Appln. KOKAI Publication No. 2002-204379. In the example, a piezoelectric element is used as means for vibrating the glass dust shield. The piezoelectric element expands and contracts in response to the voltage applied on it. It vibrates the glass dust shield attached to it, at a predetermined frequency.

Electronic imager apparatuses can operate in various modes. The user uses an electronic imager apparatus in various conditions. Among the operation modes of the electronic imager apparatus is rapid-sequence photographing mode. In the rapid-sequence photographing mode, the apparatus can acquire image data items, one after another, as long as the release SW remains closed. In this case, it is desired that the apparatus should perform a photographing process after dust is completely removed. It is therefore necessary to vibrate the glass dust shield for each photographing process. As the shield is so vibrated, the release-time lag increases, resulting in a decrease in the speed of rapid-sequence photographing. Consequently, the apparatus is not user-friendly.

It is demanded that cameras make but as little noise as possible while they perform the photographing process. To meet the demand, a camera system has been proposed, which can operate in a specific mode (hereinafter called "low-noise operating mode") to perform photographing process quietly.

In the low-noise operating mode, the camera system makes no audio messages to the user and mechanical components of the camera are so driven as to generate no noise.

When the glass dust shield is vibrated to remove dust from it, air vibrates, making noise. If the air vibrates at a frequency that falls in the audio range, it makes a noise. The user hears the noise. The user does not want to hear any noise while the camera system remains in the low-noise operating mode.

Dust may stick to the glass dust shield in various conditions. It may enter the camera and may stick to the glass dust shield when the mirror box is exposed in the course of exchanging lenses. It may more probably stick to the glass dust shield when the shutter is opened without attaching the exchange lenses (or lens unit) to the camera. Even in such a case, it may not so problematical if the shutter speed is high.

Now that cameras have a high-performance imaging element, some users attach them to telescopes to take astrographs. To take an astrograph, the shutter must be held open for a long time because the object luminance is low. Dust may stick while the shutter remains open. Most telescopes are much larger than exchange lenses and less shielded. Hence, the glass dust shield is more likely to contact dust-containing air than in the case of telescopes.

Electronic imager apparatuses can operate in a mode to photograph an object in various image qualities (number of pixels recorded, ratio of image compression, and the like). The user can photograph an object in any image quality desirable for the use of the resultant image data, for example, to be processed by personal computers or be used in preparing homepages. The user can acquire high-quality image data, by removing dust from the glass dust shield.

If the user selects low-quality image data that dust scarcely influences, however, it is useless to remove dust from the glass dust shield. In a particular case, the user may want to take as many pictures as possible at the expense of image quality. Then, it is not desirable to remove dust each time a picture is taken. As dust is repeatedly removed, the battery that supplies power to the camera system is deprived of more electric energy. This may disable the user to take a desired number of pictures.

In another specific case, the user may try to shorten the time for rapid-sequence photographing, at the expense of image quality. He may reduce the number of pixels recorded for each image, thereby to shorten the time required to access the medium, which stores the image data. If performed in this condition, the removal of dust will increase the release-time lag. Consequently, the rapid-sequence photographing speed decreases, against the user's intension.

BRIEF SUMMARY OF THE INVENTION

According to a first aspect of this invention, there is provided an imager apparatus in which an optical member protecting an imaging element is vibrated to remove dust from the optical member.

The apparatus comprises:

a vibration member which vibrates the optical member in a plurality of conditions;

a photographing-mode setting unit which sets a photographing mode; and a vibration-condition changing unit which changes the condition in which the vibration member vibrates the optical member, in accordance with the photographing mode set by the photographing-mode setting unit.

According to a second aspect of the invention, there is provided an imager apparatus of the type according to the first aspect. In this apparatus, the photographing-mode setting unit sets, as the photographing mode, one of a continuous photographing mode and a single-shot photographing mode.

According to a third aspect of the invention, there is provided an imager apparatus of the type according to the first aspect. In this apparatus, the vibration-condition changing unit changes time intervals at which the vibration member vibrates the optical member, in accordance with the photographing mode.

According to a fourth aspect of the invention, there is provided an imager apparatus of the type according to the first aspect. In the apparatus, the vibration-condition changing unit changes a frequency at which the optical member is vibrated, in accordance with the photographing mode that has been set.

According to a fifth aspect of this invention, there is provided an imager apparatus in which an optical member protecting an imaging element is vibrated to remove dust from the optical member.

This apparatus comprises:

a vibration member which vibrates the optical member;

a photographing-mode setting unit which sets a photographing mode; and an operation-prohibiting unit which prohibits the vibration member from operating, in accordance with the photographing mode set by the photographing-mode setting unit.

According to a sixth aspect of the invention, there is provided an imager apparatus of the type according to the fifth aspect. In the apparatus, the photographing-mode setting unit sets, as the photographing mode, one of a low-noise operation mode and a non-low-noise operation mode.

According to a seventh aspect of the invention, there is provided an imager apparatus of the type according to the fifth aspect. In this apparatus, the photographing-mode setting unit sets, as the photographing mode, one of a still-picture photographing mode and a moving-picture photographing mode.

According to an eighth aspect of the invention, there is provided an imager apparatus of the type according to the fifth aspect. In the apparatus, the operation-prohibiting unit allows the vibration member to operate every time a photographing operation is performed after the photographing-mode setting unit selects a single-shot photographing mode, and allows the operation-prohibiting unit to operate at only the first photographing and prohibits the vibration member from operating at the second photographing and any photographing following the second photographing.

According to a ninth aspect of this invention, there is provided an imager apparatus in which an optical member protecting an imaging element is vibrated to remove dust from the optical member.

This apparatus comprises:

a vibration member which vibrates the optical member in a plurality of conditions;

a photographing-condition setting unit which sets a photographing mode; and a vibration-condition changing unit which changes the condition in which the vibration member vibrates the optical member, in accordance with the photographing condition set by the photographing-condition setting unit.

According to a tenth aspect of the invention, there is provided an imager apparatus of the type according to the ninth aspect. In the apparatus, the photographing-condition setting unit sets a resolution for images to be photographed.

According to an eleventh aspect of the invention, there is provided an imager apparatus of the type according to the ninth aspect. In this apparatus, the photographing-condition setting unit sets time intervals at which the optical member is vibrated, in accordance with the photographing condition that has been set.

According to a twelfth embodiment of this invention, there is provided an imager apparatus in which an optical member protecting an imaging element is vibrated to remove dust from the optical member.

This apparatus comprises:

a vibration member which vibrates the optical member;

a photographing-condition setting unit which sets a photographing mode; and an operation-timing setting unit which sets a timing at which the vibration member is operated, in accordance with the photographing condition set by the photographing-condition setting unit.

According to a thirteenth aspect of the invention, there is provided an imager apparatus of the type according to the twelfth aspect. In the apparatus, the photographing-condition setting unit sets conditions for an exposure operation or selects bulb photographing.

According to a fourteenth aspect of the invention, there is provided an imager apparatus of the type according to the twelfth aspect. In this apparatus, the operation-timing setting unit causes the vibration member to operate during an exposure operation, in accordance with the conditions set by the photographing-condition setting unit.

According to a fifteenth aspect of the invention, there is provided an imager apparatus of the type according to the twelfth aspect. In the apparatus, the operation-timing setting unit causes to the vibration member to operate intermittently during an exposure operation, in accordance with the conditions set by the photographing-condition setting unit.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
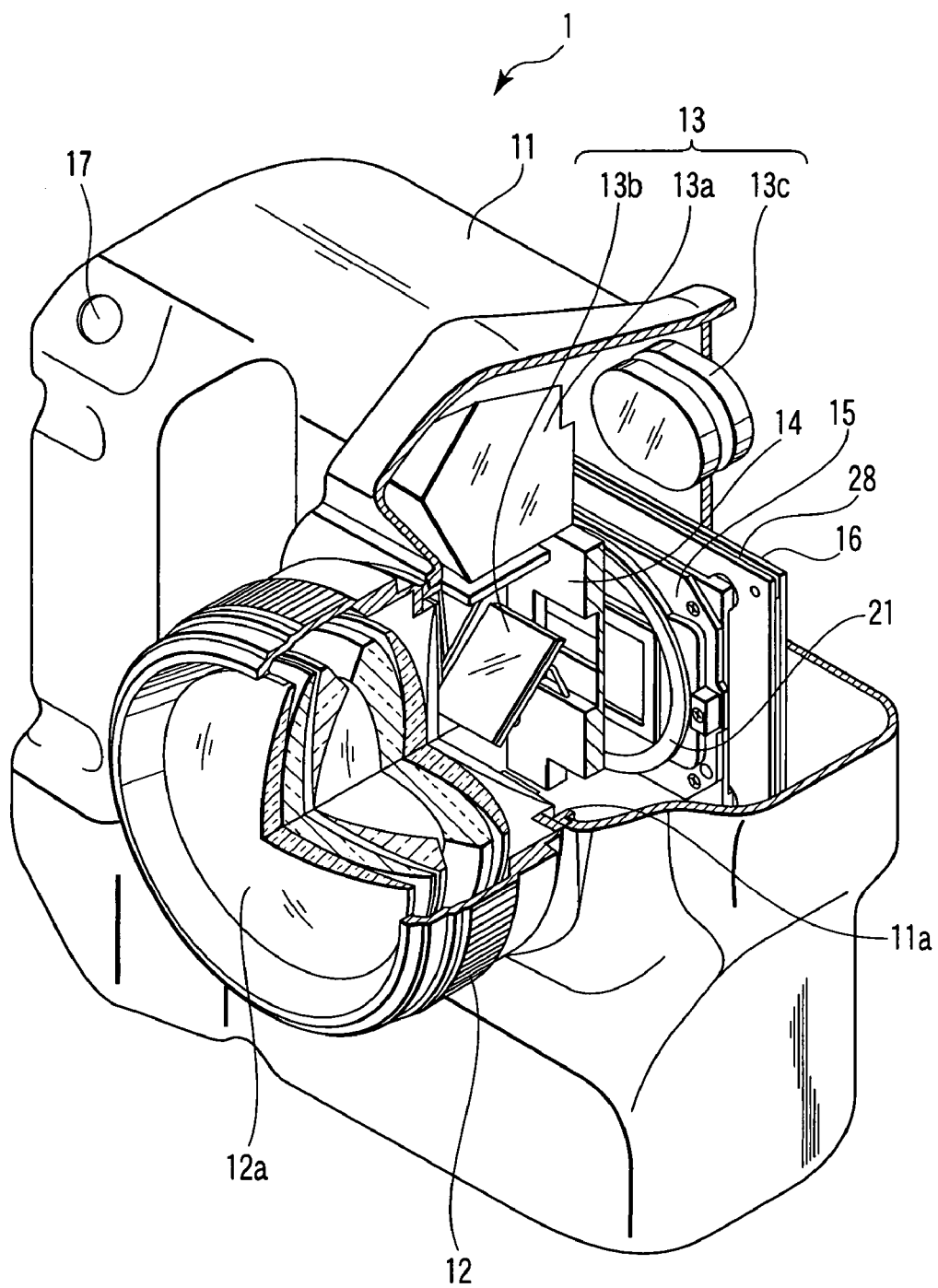
FIG. 1 is a partly sectional, perspective view schematically showing the structure of a digital camera according to the present invention.

Embodiments of the present invention will be described, with reference to the accompanying drawings. FIG. 1 is a partly sectional, perspective view that schematically shows the structure of a digital camera according to the invention. That is, FIG. 1 is a perspective view of a camera body with a part cut away, thus schematically depicting the structure in the camera body.

The camera 1 according to this embodiment comprises a camera body 11 and a lens barrel 12 which are separate units. The camera body 11 and the lens barrel 12 can be detached from each other.

The lens barrel 12 contains a photographing optical system 12a. The system 12a comprises a plurality of lenses, a mechanism for driving the lenses, and the like.

The photographing optical system 12a comprises optical lenses and the like. It is designed to allow passage of a light beam coming from an object and form an image thereof at a prescribed position (that is, on the photoelectric conversion surface of an imaging element, later described).

The lens barrel 12 protrudes forwards from the front of the camera body 11.

The camera body 11 contains various components. It has a photographing-optical-system holder 11a on its front. The holder 11a is a coupling member. It couples the lens barrel 12 containing the photographing optical system 12a, removably to the camera 11. Thus, the camera body 11 constitutes a so-called single-lens reflex camera.

The camera body 11 has an exposure opening in the center part of its front. The opening has a predetermined diameter and can guide the light beam coming from the object, into the camera body 11. It is on the rim of this opening that the photographing-optical-system holder 11a is provided.

Various members to be manipulated to operate the camera body 11 are arranged on the front of the camera body 11, in addition to the photographing-optical-system holder 11a. Among these members is a release button 17 for generating an instruction signal, which causes the camera to starts an imaging process.

The camera body 11 incorporates a finder device 13, a shutter unit 14, an imaging unit 15 and a plurality of electric circuits, which are located at specific positions. The finder device 13 constitutes a so-called observation optical system. The shutter unit 14 has a shutter mechanism that controls the time for which a light beam is applied to the photoelectric conversion surface of the imaging element. The imaging unit 15 includes an imaging element (not shown) and a dust filter 21 (also called "glass dust shield"). The imaging unit 15 generates an image signal that represents an image of the object. The dust filter 21 assumes a predetermined position, in front of the photoelectric conversion surface of the imaging element. The filter 21 is designed to prevent dust particles or the like from sticking to the photoelectric conversion surface. Among the electric circuits is a main circuit board 16, on which various electric components are amounted. (The other circuit boards are not shown in FIG. 1.)

The finder device 13 is composed of a quick-return mirror 13b, a penta-prism 13a, an objective lens 13c, and the like. The quick-return mirror 13b reflects the light beam that has passed through the photographing optical system 12a, thus guiding the beam to the observation optical system. The penta-prism 13a receives the light beam emerging from the quick-return mirror 13b, serving to form an erect, real image. The objective lens 13c magnifies the image formed by the penta-prism 13a to a size that optimal for observation.

The quick-return mirror 13b can move between a position on the optical axis the photographing optical system 12a and a position to which it retreats from the optical axis of the system 12a. Usually the mirror 13b lies on the optical axis of the photographing optical system 12a, inclined to this optical axis at an angle of, for example, 45°.

So inclined, the quick-return mirror 13b reflects the light beam coming from the object and passing through the photographing optical system 12a. The light beam, thus reflected, is applied to the penta-prism 13a that lies above the quick-return mirror 13b.

While the camera 1 is performing an imaging process, the quick-return mirror 13b remains at a specific retreat position, away from the optical axis of the photographing optical system 12a. Not blocked by the mirror 13a, the light beam coming from the object can reach the imaging element.

The shutter unit 14 is of the type used in most conventional cameras. For example, it comprises a focal-plane shutter mechanism, a drive circuit for driving this mechanism, and some other components.

Figure 2:
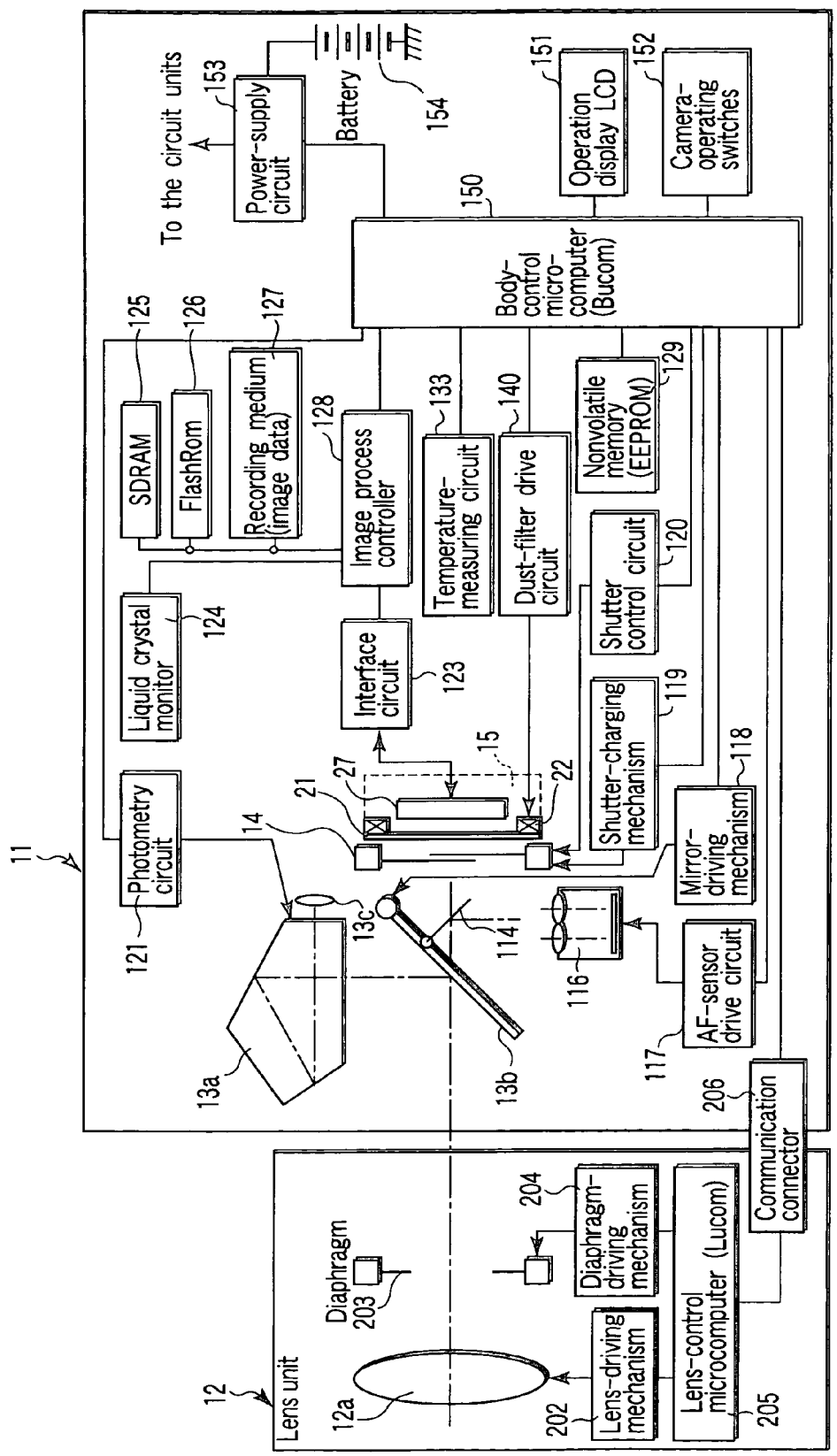
FIG. 2 is a block diagram representing the system configuration of a camera according to an embodiment of this invention.

FIG. 2 is a block diagram illustrating the system configuration of a camera according to an embodiment of the invention.

The camera system according to this embodiment comprises a camera body 11 and a lens barrel 12. The lens barrel 12, which is an exchange lens unit, is attached to the front of the camera body 11. The lens barrel 12 can be removed from the camera body 11.

The lens barrel 12 contains a lens-control microcomputer (hereinafter referred to as "Lucom") 205. Lucom 205 controls some of the other components incorporated in the lens barrel 12.

The camera body 11 contains a body-control microcomputer (hereinafter referred to as "Bucom") 150. Bucom 150 controls some of the other components incorporated in the camera body 11.

Lucom 205 and Bucom 150 are electrically connected by a connector 206 when the lens barrel 12 is coupled with the camera body 11. Once so connected, they can exchange signals.

After connected to Bucom 150, Lucom 205 operates as a component of a camera system, in subordination to Bucom 150.

The lens barrel 12 incorporates a photographing optical system 12a and a diaphragm 203.

The photographing optical system 12a is driven by a DC motor (not shown) provided in a lens-driving mechanism 202. The diaphragm 203 is driven by a stepping motor (not shown) incorporated in a diaphragm-driving mechanism 204. Lucom 205 controls these motors in accordance with the instructions supplied from Bucom 150.

As FIG. 2 shows, the camera body 11 incorporates, for example, optical components of single-lens reflex system (i.e., panta-prism 13a, quick-return mirror 13b, objective lens 13c and sub-mirror 114), a focal-plane shutter 115, and an AF sensor unit 116. The focal-plane shutter 115 lies in the optical axis. The AF sensor unit 116 receives the light beam reflected by the sub-mirror 114 and automatically measures the distance to the object.

Further, an AF-sensor drive circuit 117, a mirror-driving mechanism 118, a shutter-charging mechanism 119, a shutter control circuit 120, and a photometry circuit 121. The AF-sensor drive circuit 117 drives the AF sensor unit 116. The mirror-driving mechanism 118 drives the quick-return mirror 13b. The shutter-charging mechanism 119 applies a spring force to drive the fore-plane and aft-plane of the shutter 115. The shutter control circuit 120 controls the motion of the fore-plane and the aft-plane. The photometry circuit 121 performs photometry on the basis of the light beam coming from the penta-prism 115.

On the optical axis there is provided an imaging element 27. The imaging element 27 is a photoelectric conversion element that converts an image of the object coming through the optical system into an electric signal.

The dust filter 21 protects the imaging element 27. The dust filter 21 is an optical element arranged between the imaging element 27 and the photographing optical system 12a. It is made of transparent glass.

A piezoelectric element 22 is mounted on the circumferential edge of the dust filter 21. The element 22 makes a part of a vibrating means that vibrates the dust filter 21 at a predetermined frequency.

The piezoelectric element 22 has two electrodes. The element 22 vibrates the dust filter 21 to remove dust from the surface the filter 21 made of glass, when it driven by a dust-filter drive circuit 140 that is another part of the vibrating means.

In the vicinity of the dust filter 21, a temperature-measuring circuit 133 is provided to measure the ambient temperature of the imaging element 27.

The camera system further comprises an interface circuit 123, a liquid crystal monitor 124, a SDRAM 125, and an image process controller 128. The interface circuit 123 is connected to the imaging element 27. The SDRAM 125 is provided as a storage region. The image process controller 128 uses a flash ROM 126, a recording medium 127 and the like to process image data. The camera system therefore has not only an electronic imaging function, but also an electronic recording function and an electronic display function.

As another storage region, a nonvolatile memory 129, e.g., an EEPROM, is provided for storing control parameters that are required for controlling the camera. The memory 129 can be accessed by Bucom 150.

An operation display LCD 151 and a camera-operating switch (SW) 152 is connected to Bucom 150. The LCD 151 is provided to display the operation the camera is carrying out, thus informing the user of the operating condition of the camera.

The camera-operating switch SW 152 is a group of switches, including buttons, which may be manipulated to operate the camera.

The camera system further comprises a battery 154 and a power-supply circuit 153. The battery 154 is the power supply. The circuit 153 converts the power-supply voltage to the voltage that is necessary for the other circuit components of the camera system.

How the camera system thus configured does operate will be explained. First, the image process controller 128 controls the interface circuit 123 in accordance with an instruction supplied from Bucom 150. Image data is thereby acquired from the imaging element 27.

The image process controller 128 converts the image data to a video signal, which is supplied to the liquid crystal monitor 124. The monitor 124 displays the image represented by the video signal.

Looking at the image displayed on the liquid crystal monitor 124, the user can recognize the image photographed of the object.

The SRAM 125 is a memory for storing the image data temporarily. It is used as a work area in the process of, for example, converting the image data to a video signal.

The image data is converted to JPEG data, which is stored in the recording medium 127.

As mentioned above, the imaging element 27 protected by the dust filter 21 is made of transparent glass.

The piezoelectric element 22 is mounted on the circumferential edge of the dust filter 21 to vibrate the surface of the dust filter 21 made of glass. The piezoelectric element 22 is driven by dust-filter drive circuit 140, as will be later described in detail.

To achieve effective dust shielding, it is desired that the imaging element 27 and piezoelectric element 22 be held together in a case that is defined by a frame that is indicated by broken lines.

Generally, temperature influences the elastic modulus of any glass member. Thus, it is a factor that changes the natural frequency of the glass member. It is necessary to measure the temperature at which the glass member is to be used and to estimate changes in the natural frequency of the glass member.

Thus it is desirable to measure the changes in the temperature of the dust filter 21 protecting the front surface of the imaging element 27 that undergoes prominent temperature changes while operating, and to estimate the natural frequency that the dust filter 21 may have when the element 27 operates.

In this embodiment, a sensor (not shown) is connected to the temperature-measuring circuit 133 to measure the ambient temperature of the imaging element 27.

Preferably, the point at which the sensor measures the temperature should exist very close to the plane in which the dust filter 21 is vibrated.

The mirror-driving mechanism 118 is a mechanism designed to drive the quick-return mirror 13b between an Up-position and a Down-position. While remaining in the Down-position, the quick-return mirror 13b splits the light beam coming from the photographing optical system 12a, into to two beams. The first beam is applied to the AF sensor unit 116. The second beam is applied to the panta-prism 13a.

The output of the AF sensor incorporated in the AF sensor unit 116 is transmitted to Bucom 150 via the AF-sensor drive circuit 117. A distance-measuring process of known type is carried out.

The user can see the image of the object through the objective lens 13c that lies adjacent to the penta-prism 13a. Part of the light beam that has passed through the penta-prism 13a is led to the photosensor (not shown) provided in the photometry circuit 121. The photosensor measures the amount of the light it has received. Based on the amount of light, thus detected, the circuit 121 performs the photometry that is well known in the art.

The imaging unit 15 of the camera 1 according to the present embodiment will be described in detail.

Figure 3:
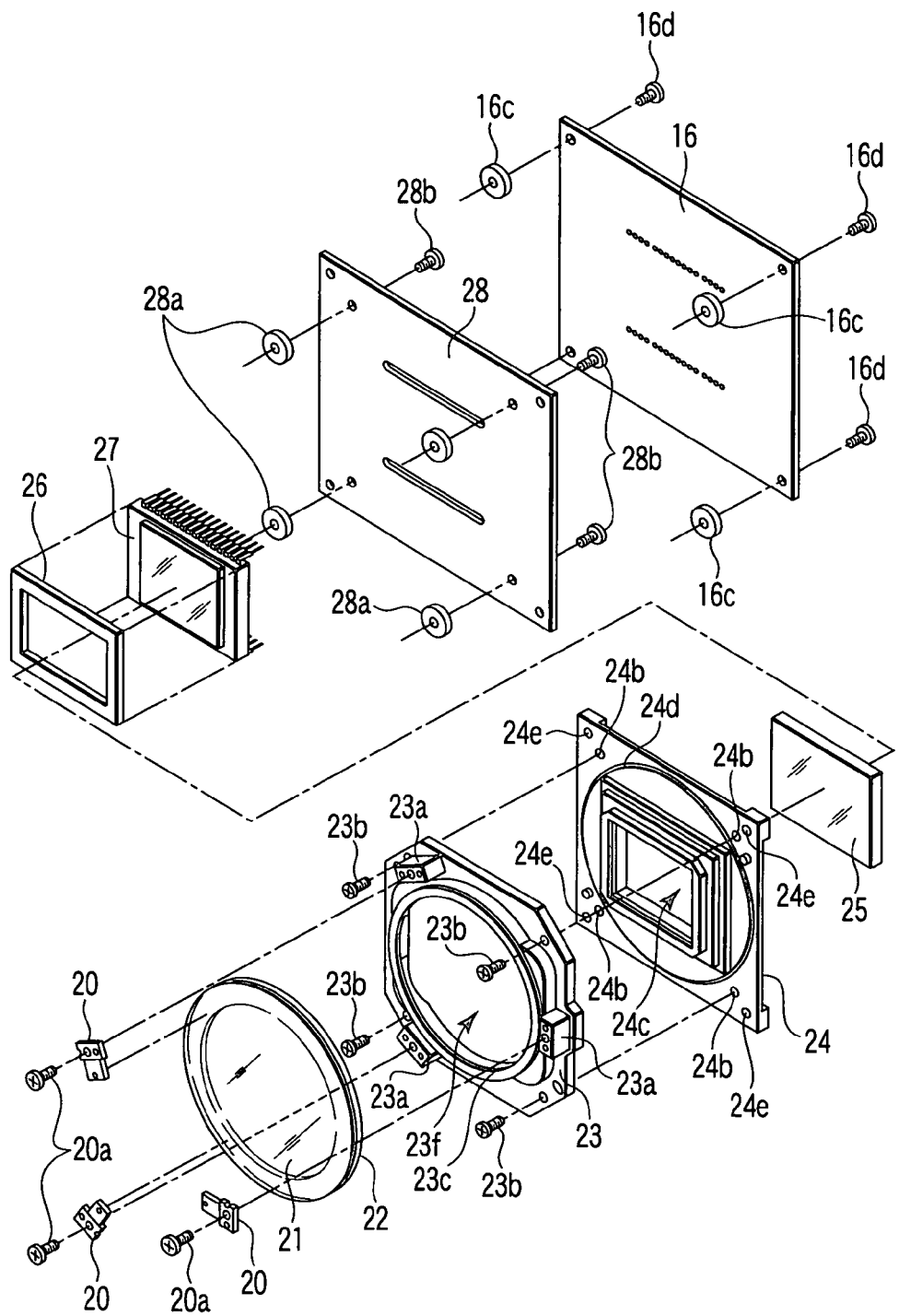
FIG. 3 is an exploded view of the imaging unit, showing the major components of the unit.
Figure 4:
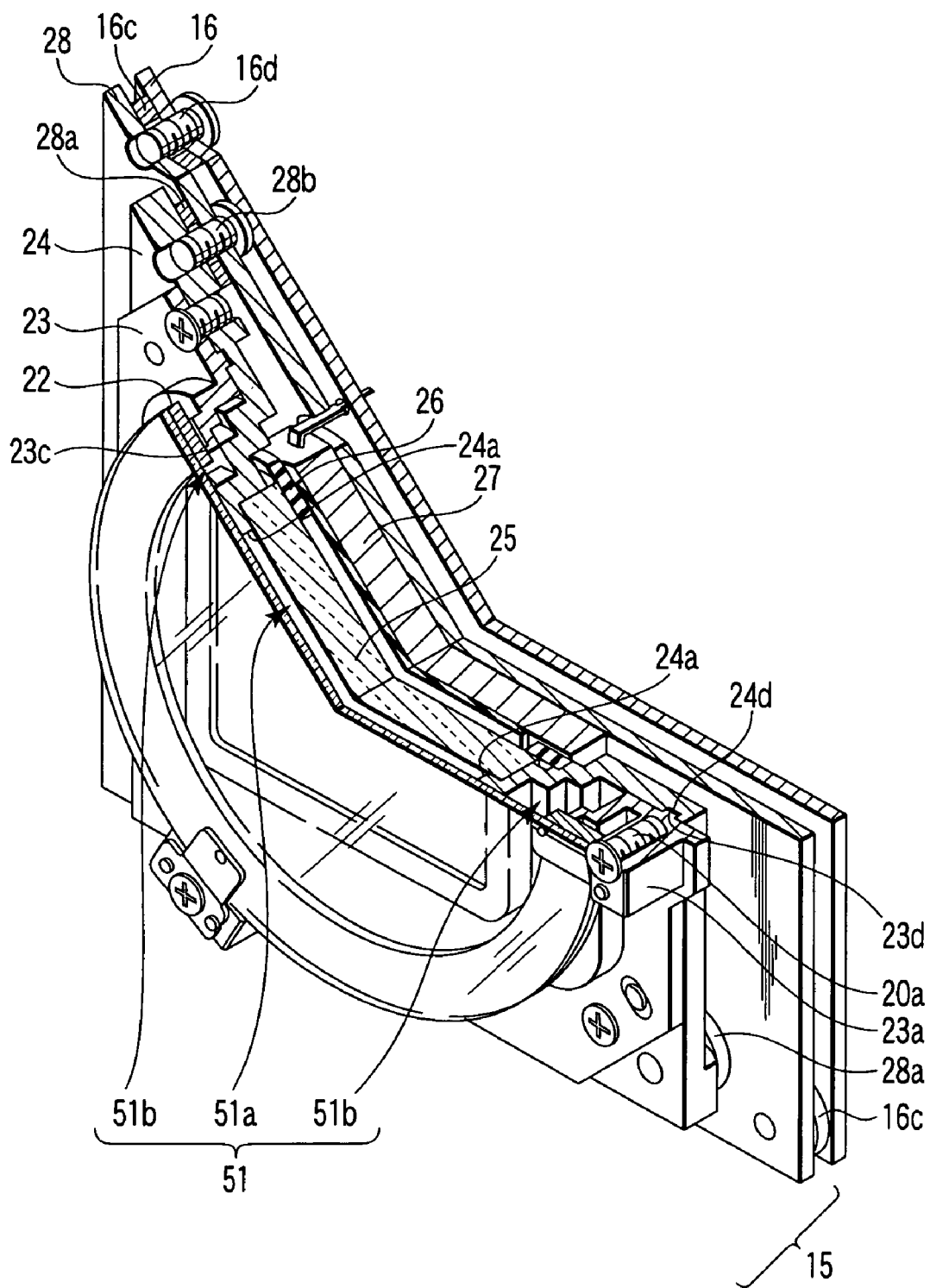
FIG. 4 is a perspective view illustrating the imaging unit with a part cut away.
Figure 5:
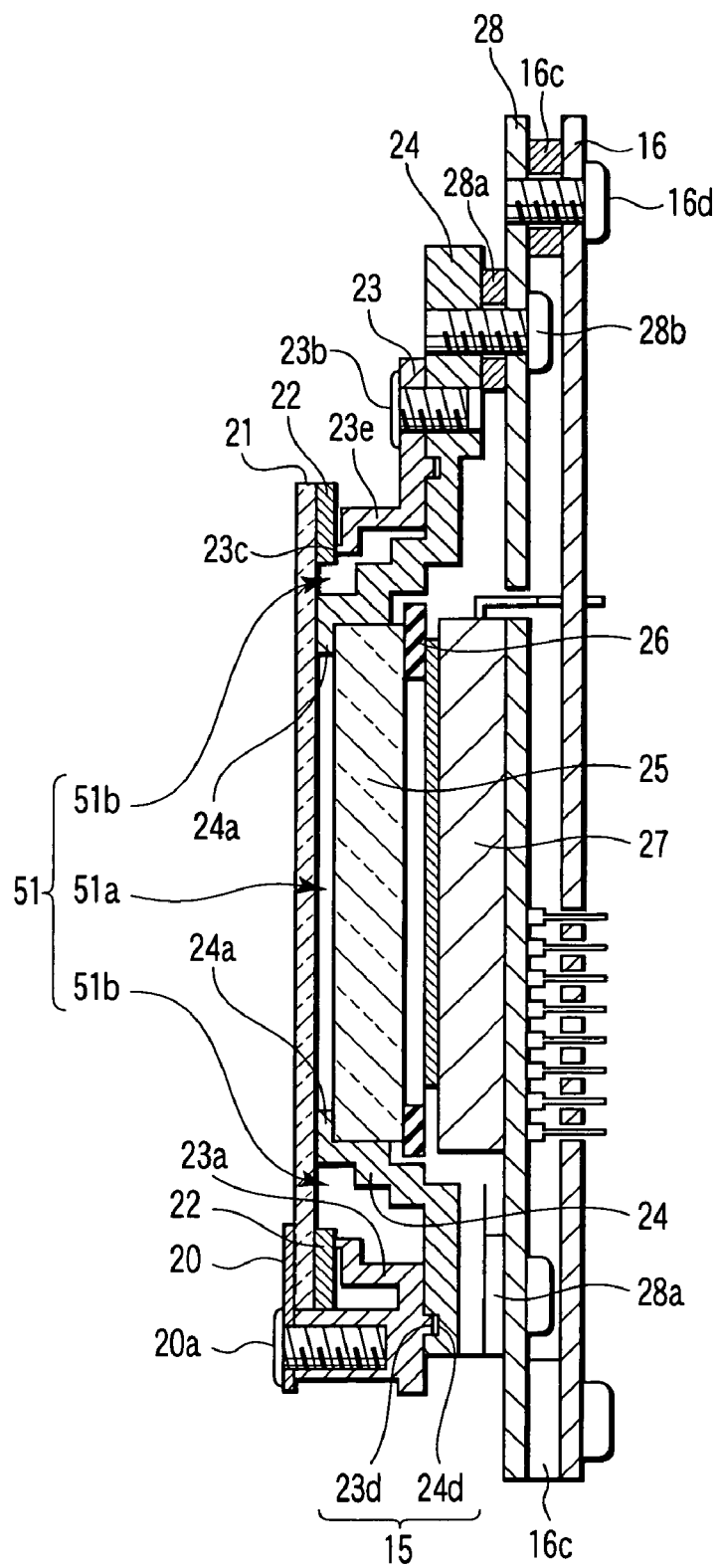
FIG. 5 is a sectional view taken along a plane at which a part of the imaging unit is cut away in FIG. 4.

FIG. 3, FIG. 4 and FIG. 5 are diagrams some sections of the imaging unit 15. FIG. 3 is an exploded view of the imaging unit, showing the major components of the unit.

FIG. 4 is a perspective view illustrating the imaging unit with a part cut away. FIG. 5 is a sectional view taken along a plane at which a part of the imaging unit is cut away in FIG. 4.

The imaging unit 15 of this embodiment is a unit composed of various components including the shutter unit 14. FIGS. 3 to 5 do not show the shutter section 14 is not shown as a whole, nonetheless. They illustrate only the major components of the section 14.

To represent the positional relation of the components of the section 14, FIGS. 3 to 5 also show the main circuit board 16 which is arranged near the imaging unit 15 and on which the various electric components, such as an image-signal processing circuit and a work memory, are amounted.

The main circuit board 16 will not be described in detail, because it is of the type generally used in conventional cameras and the like.

The imaging unit 15 comprises the imaging element 27, an element-holding plate 28, a low pass filter 25, a filter-holding member 26, a case member 24, a filter-supporting member 23, the dust filter 21, the piezoelectric element 22, and a pushing member 20. The imaging element 27 is, for example, a CCD and generates an image signal from the light coming through the photographing optical system 12a and applied to its photoelectric conversion surface. The element-holding plate 28 is a thin plate and holds the imaging element 27. The low pass filter 25 (hereinafter referred to as "optical LPF") is arranged in front of the photoelectric conversion surface of the imaging element 27. The optical LPF 25 removes high-frequency components from the light beam coming from the object through the photographing optical system 12a and applied to the imaging element 27. The filter-holding member 26 is an elastic member shaped like a frame and surrounds the optical LPF 25 and imaging element 27. The case member 24 (hereinafter called "CCD case "24") contains and holds the imaging element 27. The CCD case 24 is so arranged, contacting and supporting the optical LPF 25 (optical element) at its peripheral part and its part near the circumferential part, and contacting the filter-supporting member 23 at its predetermined part. The filter-supporting member 23 lies in front of the CCD case 24, contacting and supporting the dust filter 21 at its circumferential part and its part near the circumferential part. The dust filter 21 is a dust-shielding member that is supported by the filter-supporting member 23. The filter 21 lies in front of the photoelectric conversion surface of the imaging element 27 and in front of the optical LPF 25. The filter 21 opposes the optical LPF 25, spaced apart therefrom by a predetermined distance. The piezoelectric element 22 is an electromechanical element for vibrating the dust filter 21 in a specific manner. It is mounted on the circumferential edge of the dust filter 21. The pushing member 20 is an elastic member, which secures the dust filter 21 to the filter-supporting member 23 in airtight fashion.

The imaging element 27 receives the light beam coming from the object through the photographing optical system 12a, at its photoelectric conversion surface. The element 27 performs photoelectric conversion on the light beam, generating an image signal that represents the image of object formed on the photoelectric conversion surface. The element 27 is, for example, a charge coupled device (CCD).

The imaging element 27 is fastened to the element-holding plate 28, which in turn is mounted on a prescribed part of the main circuit board 16.

On the main circuit board 16, the image-signal processing circuit and the work memory are amounted as has been specified above. The image-signal processing circuit and the work memory process any signals output from the imaging element 27.

In front of the imaging element 27, the optical LPF 25 is arranged, interposed between the filter-holding member 26 and the imaging element 27.

The CCD case 24 is arranged, covering the imaging element 27, filter-holding member 26 and optical LPF 25.

The CCD case 24 has a rectangular opening 24c, which is made in almost the center part. In the opening 24c, the optical LPF 25 and imaging element 27 have been fitted from the back of the CCD case 24.

As FIGS. 4 and 5 show, the rim of the opening 24c has a stepped portion 24a at its rear part. The stepped portion 24a has a cross section shaped like letter L.

As indicated above, the filter-holding member 26 made of elastic material is provided between the optical LPS 25 and the imaging element 27.

The member 26 for holding the low pass filter is arranged at the peripheral part of the imaging element 27, not covering the effective region of the photoelectric conversion surface of the element 27. The filter-holding member 26 abuts on the back of the optical LPF 25, more precisely on the edges thereof.

An airtight space is thus provided between the optical LPF 25 and the imaging element 27.

The elastic force of the filter-holding member 26 may move the optical LPF 25 to move in the axial direction thereof.

In view of this, the optical LPF 25 is arranged, with its peripheral edges contacting the stepped portion 24a of the CCD case 24 in airtight fashion. This controls the movement of the optical LPF 25 in its optical axis, against the elastic force of the filter-holding member 26.

In other words, the optical LPF 25, which has been inserted into the opening 24c of the CCD case 24 from the back of the CCD case 24, is restricted in term of its movement in the direction of its optical axis.

Hence, the optical LPF 25 cannot be pulled out from the CCD case 24, from the front thereof.

After the optical LPF 25 is inserted into the opening 24c of the CCD case 24 from the back thereof, the imaging element 27 is mounted on the back of the optical LPF 25.

In this embodiment, the filter-holding member 26 is clamped between the optical LPF 25 and the imaging element 27.

As described earlier, the imaging element 27 is mounted on the element-holding plate 28, which in turn is mounted on the main circuit board 16.

The element-holding plate 28 is fastened to the back of the CCD case 24, with spacers 28a interposed between it and the CCD case 24, by means of screws 28b. The screws 28b pass through the screw holes 24e and are driven into the CCD case 24 from the back thereof.

The main circuit board 16 is secured to the element-holding plate 28 by screws 16d, with spacers 16c interposed between it and the plate 28.

The filter-supporting member 23 fastened to the front of the CCD case 24 by screws 23d that are driven into screw holes 24b made in the front of the CCD case 24.

In this embodiment, an annular groove 24d is made in the front of the CCD case 24, in the peripheral part thereof, as is illustrated in FIG. 4 and FIG. 5.

An annular projection 23d (not shown in FIG. 3) is formed on the back of the filter-supporting member 23, more precisely on the peripheral part of the member 23. The projection 23d is aligned with the annular groove 24d of the CCD case 24.

Thus, as the annular projection 23d fits into the annular groove 24d, the CCD case 24 and the filter-supporting member 23 are coupled to each other in airtight fashion, at the region in which the projection 23d and groove 24d are provided.

The dust filter 21 is a plate that is either circular or polygonal. The filter 21 has a transparent region whose center coincides with that of the filter 21. This region expands from its center, in radial direction to specific extent. The transparent region opposes the optical LPF 25, spaced therefrom by a prescribed distance.

The piezoelectric element 22, i.e., electro-mechanical member for vibrating the dust filter 21, is secured to one surface of the dust filter 21 (i.e., the back of the filter 21, in this embodiment) by means of, for example, adhesion using an adhesive. Thus, the piezoelectric element 22 is rendered integral with the dust filter 21.

The piezoelectric element 22 can vibrate the dust filter 21 in a specific manner when a predetermined drive voltage is applied to it from an external device.

The pushing member 20, i.e., an elastic member such as a leaf spring, pushes the dust filter 21 onto the filter-supporting member 23, holding together the dust filter 21 and the filter-supporting member 23 in airtight fashion.

The filter-supporting member 23 has a circular or polygonal opening 23f near its center part.

This opening 23f allows passage of the light coming through the photographing optical system 12a. The opening 23f is large enough to make the light irradiate the entire photoelectric conversion surface of the imaging element 27 that lies at the back of the filter-supporting member 23.

An annular wall 23e (see FIG. 4 and FIG. 5), which is substantially annular, is secured to the rim of the opening 23f. The distal end of the wall 23e is a holding part 23c that protrudes forwards.

A plurality of projections 23a (three in this embodiment) protrude from the front of the filter-supporting member 23, in the vicinity of the peripheral part of the member 23.

These projections 23a are provided to secure the pushing member 20 that holds the dust filter 21 in airtight fashion. The pushing member 20 is secured to the distal ends of the projections 23a by fastening means such as screws 20a.

As pointed out above, the pushing member 20 is an elastic member such as a leaf spring. Its proximal end is secured to the projections 23a, and its free end abuts on the circumferential edge of the dust filter 21. Hence, the member 20 presses the dust filter 21 onto the filter-supporting member 23. That is, it pushes to the dust filter 21 along the optical axis of the dust filter 21.

In this embodiment, that part of the piezoelectric element 22 which is arranged on the back of the dust filter 21, more specifically on the circumferential edge of the filter 21, abuts on the holding part 23c. This controls the movement of the dust filter 21 and piezoelectric element 22 in the direction of their optical axes.

Therefore, the dust filter 21 is secured in airtight fashion to the filter-supporting member 23, by virtue of the piezoelectric element 22.

In other words, the filter-supporting member 23 is coupled in airtight fashion to the dust filter 21, with the piezoelectric element 22 interposed between it and the dust filter 21, thanks to the pushing force of the pushing member 20.

As described above, the filter-supporting member 23 and the CCD case 24 are coupled in airtight fashion because the annular projection 23d fits in the annular groove 24d (see FIG. 4 and FIG. 5). In addition, the filter-supporting member 23 and the dust filter 21 are coupled in airtight fashion, with the piezoelectric element 22 interposed between them, owing to the elastic force of the pushing member 20.

The optical LPF 25 arranged in the CCD case 24 is held almost airtight, between the front peripheral edges of the optical LPF 25 and the stepped portion 24a of the CCD case 24.

The imaging element 27 is mounted on the filter-holding member 26, which in turn is placed on the back of the optical LPF 25. Substantially airtight sealing is achieved also between the optical LPF 25 and the imaging element 27.

Thus, a predetermined space 51a is provided between the optical LPF 25 and the dust filter 21.

Further, the CCD case 24, filter-supporting member 23 and dust filter 21 define a space 51b around the peripheral edges of the optical LPF 25.

The space 51b is a closed space that extends outwards from the optical LPF 25 (see FIG. 4 and FIG. 5).

The space 51b is than the space 51a.

The space 51a and the space 51b make a closed space 51 that is defined by the CCD case 24, filter-supporting member 23, dust filter 21 and optical LPF 25 as mentioned above.

Thus, the imaging unit 15 of the camera according to this embodiment has a seal structure having a space 51 which is substantially closed and which lies around the peripheral edges of the optical LPF 25 and the circumference of the dust filter 21.

The seal structure not only lies around the peripheral edges of the optical LPF 25, but also extends outwards therefrom.

The present embodiment has another seal structure. This seal structure comprises the filter-supporting member 23 and the CCD case 24, and the like. The filter-supporting member 23 is the first member that holds the dust filter 21, contacting the circumferential part thereof. The CCD case 24, which is the second member, is arranged, holding the optical LPF 25 and contacting the peripheral edges thereof.

In the camera according to this embodiment, so configured as described above, the dust filter 21 lies in front of the imaging element 27 and opposes the element 27 and the closed space 51 is provided at the photoelectric conversion surface of the imaging element 27 and around the circumferential part of the dust filter 21. This prevents dust and the like from sticking to the photoelectric conversion surface of the imaging element 27.

Dust and the like may stick to the front of the dust filter 21, which is exposed outside. Nonetheless, dust and the like can be removed from the dust filter 21 by periodically applying a voltage to the piezoelectric element 22. Thus applied with a voltage, the element 22, which is formed integral with the dust filter 21, vibrates the dust filter 21 in a specific way. The dust and the like can therefore be removed.

Figure 6:
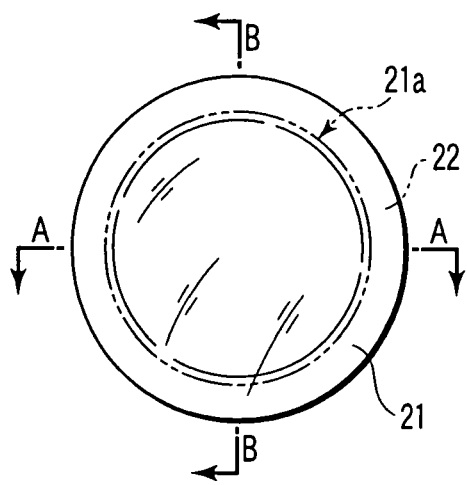
FIG. 6 is a front view of only the dust filter 21 and the piezoelectric element 22 formed integral with the filter 21, both provided in the imaging unit 15 of the camera 1.

How the dust filter 21 is vibrated to remove dust from it will be explained. FIG. 6 is a front view of only the dust filter 21 and the piezoelectric element 22 formed integral with the filter 21, both provided in the imaging unit 15 of the camera 1.

Figure 7:
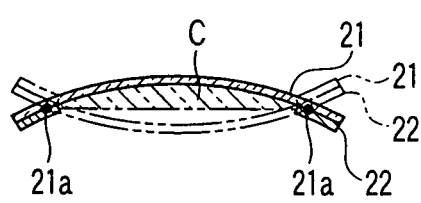
FIG. 7 and FIG. 8 are diagrams showing how the conditions of the dust filter 21 and piezoelectric element 22 change when a drive voltage is periodically applied to the piezoelectric element 22 (FIG. 6), FIG. 7 and FIG. 8 being sectional views, respectively taken along lines A-A and B-B shown in FIG. 6.
Figure 8:
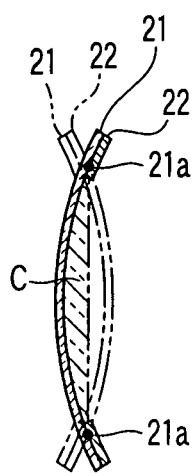

FIG. 7 and FIG. 8 are diagrams showing how the conditions of the dust filter 21 and piezoelectric element 22 change when a drive voltage is periodically applied to the piezoelectric element 22 shown I FIG. 6. FIG. 7 is a sectional view taken along line A-A in FIG. 6. FIG. 8 is a sectional view taken along line B-B shown in FIG. 6.

When a negative (−) voltage, for example, is applied to the piezoelectric element 22, the dust filter 21 deforms as indicated by the solid lines in FIG. 7 and FIG. 8. When a positive (+) voltage is applied to the piezoelectric element 22, the dust filter 21 deforms as indicated by the dotted lines in these figures.

The amplitude of vibration is almost zero at such a node 21a of vibration as illustrated in FIG. 6 to FIG. 8. Accordingly, the holding part 23c of the filter-supporting member 23 is set at the node 21a, in abutment to the dust filter 21. The filter-supporting member 23 can therefore effectively support the dust filter 21, not hindering the vibration of the dust filter 21. In this condition, a voltage may be periodically applied to the piezoelectric element 22. Then, the element 22 vibrates the dust filter 21, whereby the dust and the like are removed from the surface of the dust filter 21.

The resonance frequency of the dust filter 21 depends on the shape, thickness, material and the like of the dust filter 21. Note that FIG. 6 to FIG. 8 show how the dust filter 21 undergoes primary vibration.

Figure 9:
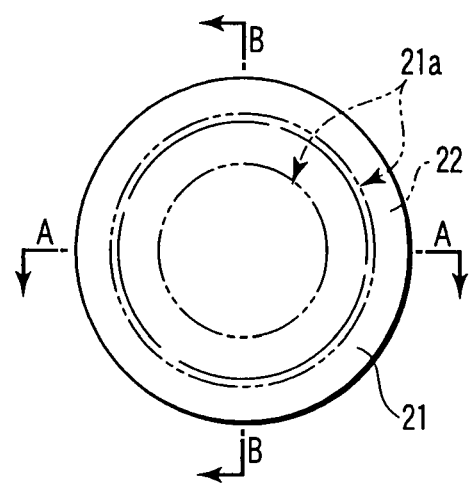
FIG. 9 is, like FIG. 6, a front view of only the dust filter 21 and the piezoelectric element 22 formed integral with the filter 21, both incorporated in the imaging unit 15 of the camera 1.
Figure 10:
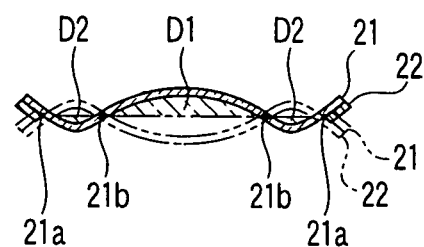
FIG. 10 and FIG. 11 are diagrams showing how the conditions of the dust filter 21 and piezoelectric element 22 change when a drive voltage is periodically applied to the piezoelectric element 22 (FIG. 9) to generate secondary vibration, FIG. 10 and FIG. 11 being sectional views, respectively taken along lines A-A and line B-B shown in FIG. 9.
Figure 11:
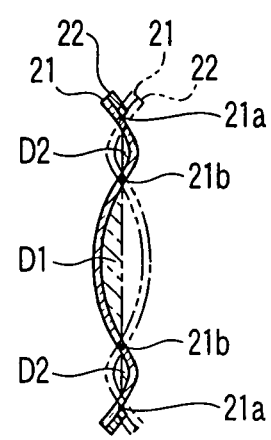

FIG. 9 to FIG. 11 illustrate how a dust filter 21 of the same structure as is shown in FIG. 6 to FIG. 8 undergoes secondary vibration.

FIG. 9 is, like FIG. 6, a front view of only the dust filter 21 and the piezoelectric element 22 formed integral with the filter 21, both incorporated in the imaging unit 15 of the camera 1.

FIG. 10 and FIG. 11 are diagrams showing how the conditions of the dust filter 21 and piezoelectric element 22 change when a drive voltage is periodically applied to the piezoelectric element 22 of FIG. 9 to generate secondary vibration. FIG. 10 is a sectional view taken along line A-A shown in FIG. 9. FIG. 11 is a sectional view taken along line B-B shown in FIG. 9.

When a negative (−) voltage, for example, is applied to the piezoelectric element 22, the dust filter 21 deforms as indicated by the solid lines in FIG. 10 and FIG. 11. When a positive (+) voltage is applied to the piezoelectric element 22, the dust filter 21 deforms as indicated by the dotted lines these figures.

In this case, two nodes of vibration, 21a and 21b, exist as depicted in FIG. 9 to FIG. 11. Accordingly, the holding part 23c of the filter-supporting member 23 is set at the node 21a, in abutment to the dust filter 21. The filter-supporting member 23 can therefore effectively support the dust filter 21, not hindering the vibration of the dust filter 21, as in the case illustrated in FIG. 6 to FIG. 8.

Hence, the piezoelectric element 22 vibrates the dust filter 21 when a voltage is periodically applied to it. The dust and the like are thereby removed from the surface of the dust filter 21.

Figure 12:
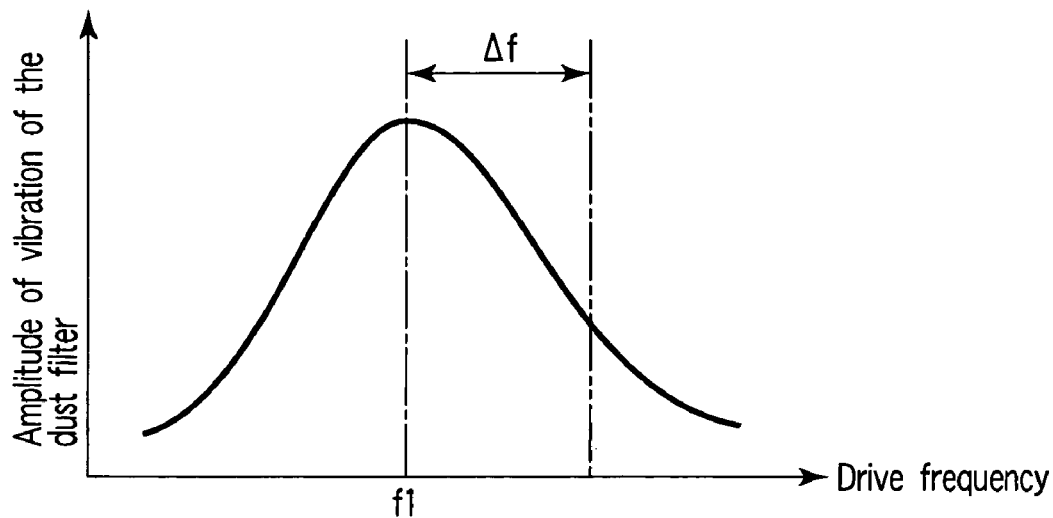
FIG. 12 is a diagram that represents the relation between the frequency of the signal applied to the dust filter and the amplitude of vibration.

The resonance frequency of the dust filter 21 depends on the material and shape of the dust filter 21. FIG. 12 represents the relation between the frequency of the signal applied to the dust filter and the amplitude of vibration.

As evident from FIG. 12, the dust filter 21 will acquire the maximum amplitude of vibration if it undergoes primary vibration at resonance frequency f1. The greater the amplitude of vibration of the dust filter 21, the more effectively the dust will be removed. At resonance frequency f0, however, the impedance of the piezoelectric elements 22a and 22b decreases. This inevitably increases the power required to drive the dust filter 21. If the dust filter 21 deforms greatly, the aberration caused by the dust filter will increase, possibly degrading the image quality. These events should be taken into account in determining how to drive the dust filter 21 during the exposure process.

When vibrated at a frequency within the audible range, the dust filter generates sound that man can hear. When driven at resonance frequency f1, the sound pressure rises. Some users may feel that the sound the dust filter 21 makes is annoying. Further, this sound may be undesirable in some condition in which the camera is used.

To control the impedance and vibration amplitude of the dust filter 21, it is necessary, as case may be, to drive the dust filter 21 at a frequency other than resonance frequency f1. The memory 129 stores the data of the deviation (Δf) that should be applied in order to drive the dust filter 21 at a frequency other than resonance frequency f1. The deviation Δf may be changed, if necessary, to alter the driving mode of the dust filter 21.

The dust filter 21 will acquire resonance frequency f2 when it undergoes secondary vibration. Like the amplitude of primary vibration, the amplitude of secondary vibration is maximal at resonance frequency f2. The maximum amplitude of secondary vibration is, however, smaller than the maximum amplitude of primary vibration.

Figure 14:
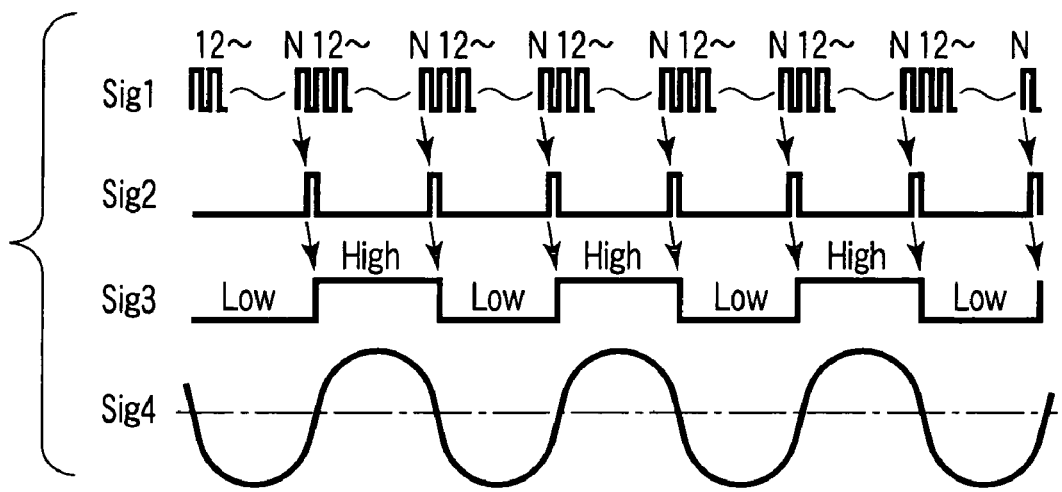
FIG. 14 is a timing chart explaining how the dust filter 21 is driven in the camera that has a dust-shielding function.
Figure 13:
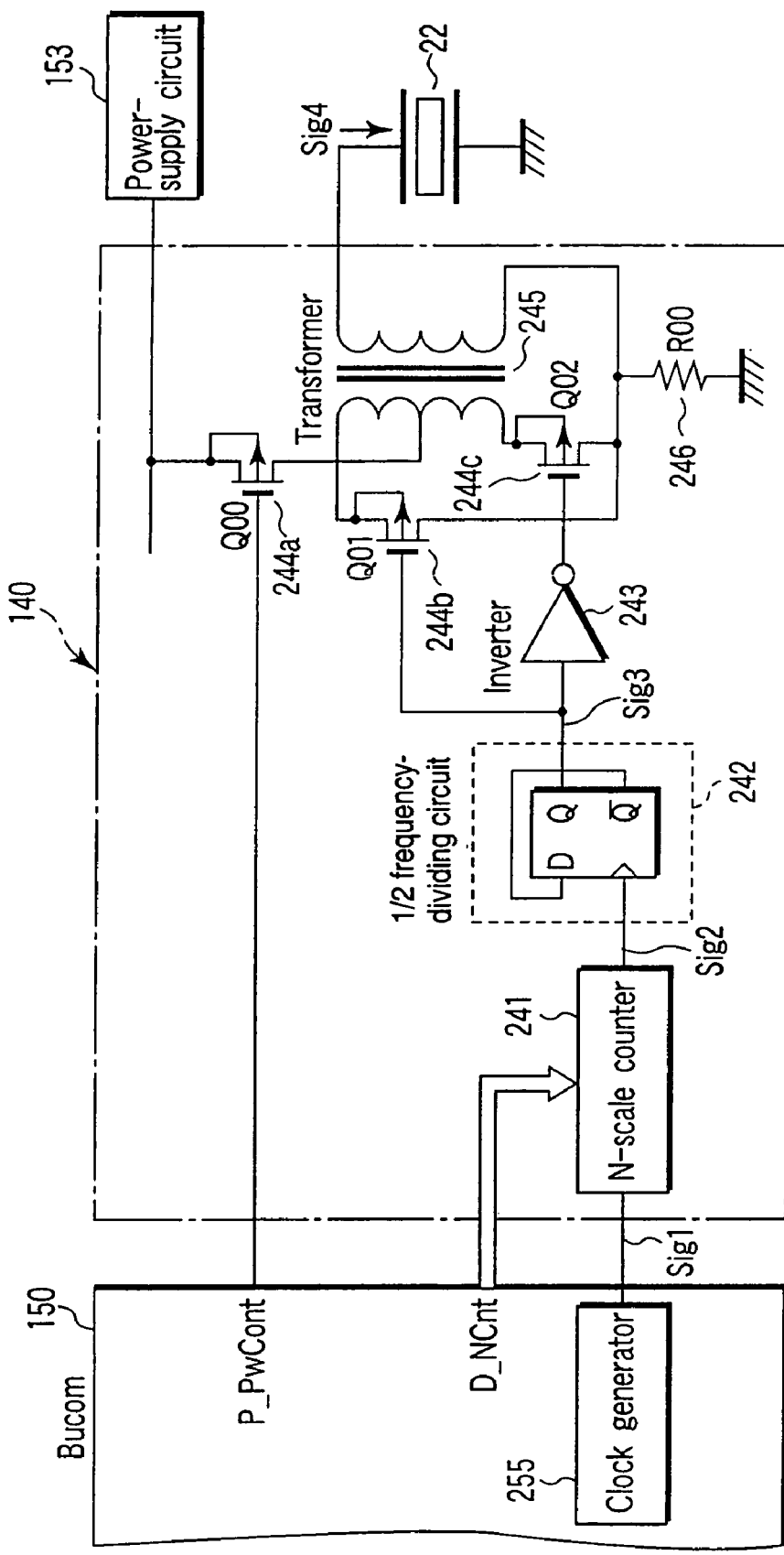
FIG. 13 is a circuit diagram of the dust-filter drive circuit 140.

A method of driving the dust filter 21 provided in the camera with dust-shielding function, according to this embodiment, will be described with reference to FIG. 13 and FIG. 14. FIG. 13 is a circuit diagram of the dust-filter drive circuit 140. FIG. 14 is a timing chart.

A dust-filter drive circuit 140 exemplified here has such a configuration as shown in FIG. 13. Some of its components generate signals (Sig 1 to Sig 4) that have waveforms illustrated in the timing chart of FIG. 14. Using these signals, the circuit 140 operates as will be described below.

As shown in FIG. 13, the dust-filter drive circuit 140 comprises an N-scale counter 241, a ½ frequency-dividing circuit 242, an inverter 243, a plurality of MOS transistors 244a, 244b and 244c (Q00, Q01, Q02), a transformer 245, and a resistor 246 (R00).

The transistors 244b (Q01) and 244c (Q02), both connected to the primary winding of the transformer 245 are turned on or off, generating a signal (Sig 4) having a predetermined frequency, at the secondary winding of the transformer 245. The signal drives the piezoelectric element 22, which causes the dust filter 21 to undergo resonation.

Bucom 150 has two IO ports P_PwCont and D_NCnt and incorporates a clock generator 255. The IO ports are provided as control ports. The IO ports and the clock generator 255 cooperate to control the dust-filter drive circuit 140 as will be described below.

The clock generator 255 generates a pulse signal that has a frequency much higher than the frequency of the signal applied to the piezoelectric element 22. The pulse signal (basic clock signal) is supplied to the N-scale counter 241.

This pulse signal is the signal Sig 1 that has the waveform depicted in the timing chart of FIG. 14. The basic clock signal is input to the N-scale counter 241.

The N-scale counter 241 counts the pulses of the pulse signal. Every time its count reaches a prescribed value "N," the counter 241 outputs a count-end pulse signal. That is, the counter 241 divides the frequency of the basic clock signal by N. The signal output from the counter 241 is the signal Sig 2 that has the waveform depicted in the timing chart of FIG. 14.

The duty ratio, i.e., ratio of high level to low level, of the pulse signal, thus frequency-divided, is not 1:1. The duty ratio of this signal is changed to 1:1 by means of the ½ frequency-dividing circuit 242. The pulse signal, thus changed in duty ratio, corresponds to the signal Sig 3 that has the waveform depicted in the timing chart of FIG. 14.

While the pulse signal changed in duty ratio remains at high level, the MOS transistor 244b (Q01) that has received this signal is on. In the meantime, the pulse signal is supplied to the transistor 244c (Q02) via the inverter 243. Hence, the transistor 244c (Q02) is on while the pulse signal remains at low level. The transistors 244b (Q01) and 244c (Q02), both connected to the primary winding of the transformer 245 are alternately turned on. As a result, a signal Sig 4 that as the frequency shown in FIG. 14 is generated at the secondary winding of the transformer 245.

The winding ratio in the transformer 245 is determined by the output voltage of the power-supply circuit 153 and the voltage required to drive the piezoelectric element 22. The resistor 246 (R00) is provided to prevent an excessive current from flowing through the transformer 245.

To drive the piezoelectric element 22, the transistor 244a (Q00) should be on and the power-supply circuit 153 should apply a voltage to the center tap of the transformer 245. As may be seen from FIG. 13, the transistor 244a (R00) is turned on or off by using the IO port P_PwCont. The count value "N" can be set to the N-scale counter 241 from the IO port D_NCnt. Thus, Bucom 150 controls the count value "N", thereby to change the drive frequency of the piezoelectric elements 22 to any value desired.

The drive frequency can be calculated by:

$$fdrv = fpls/2N \quad (1)$$

where, fdrv: frequency of the signal to be applied to the piezoelectric elements fpls: the frequency of the pulse output from the clock generator N: the count value to be set to the counter.

The calculation of Equation 1 is performed by the CPU (control means) of Bucom 150.

FIRST EMBODIMENT

Figure 15:
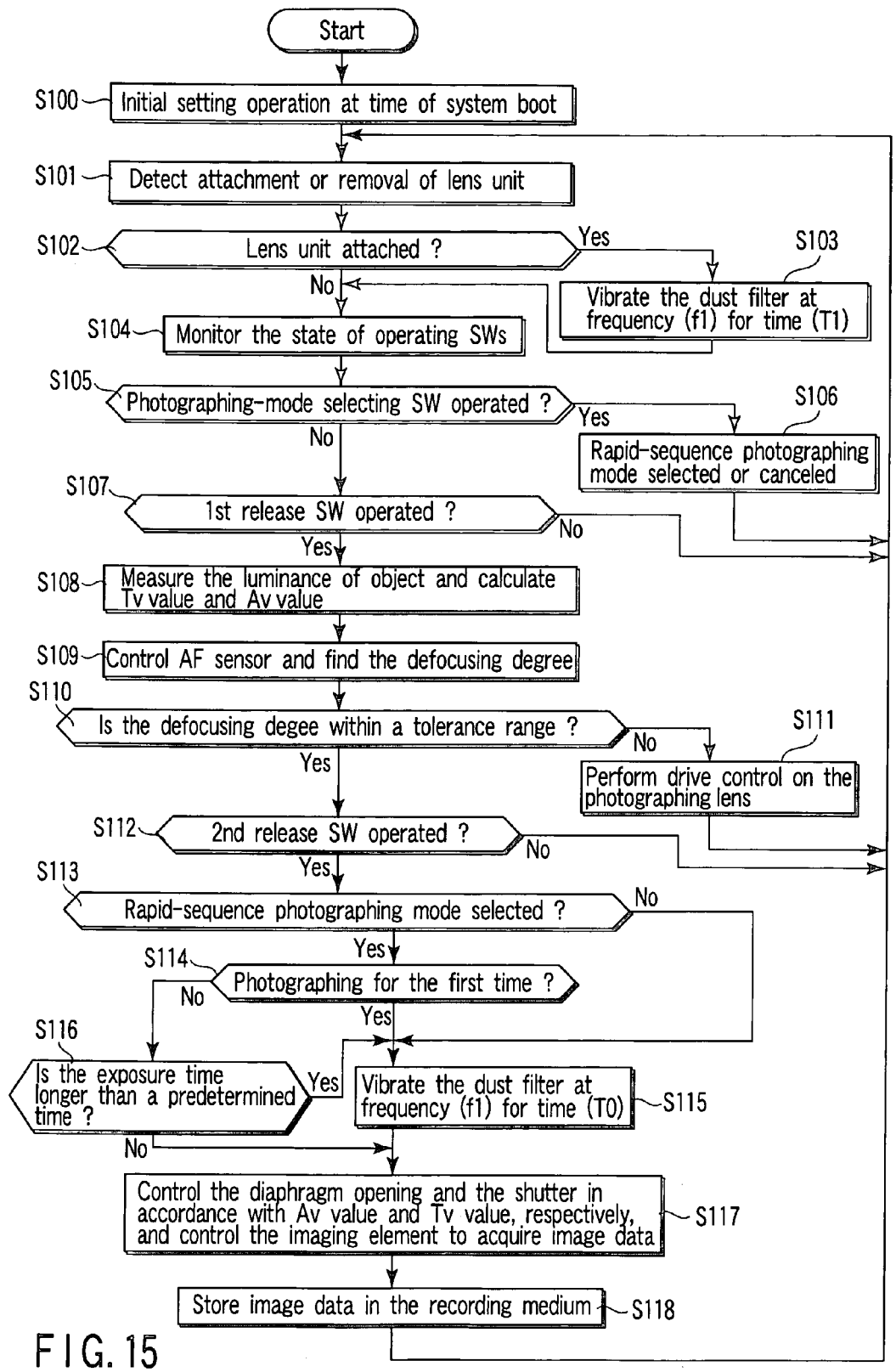
FIG. 15 is a flowchart explaining a method of driving Bucom 150 incorporated in a camera system according to a first embodiment of the invention.

FIG. 15 is a flowchart explaining a method of driving Bucom 150 incorporated in the camera system according to a first embodiment of the invention.

Bucom 150 starts operating when the power-supply switch on the camera is turned on. In Step S100, a process of booting the camera system is carried out. First, the power-supply circuit 153 is controlled, supplying power to the circuit units of the camera system. Further, the circuit units are initialized.

Step S101 is a process of determining whether the lens unit 12, which is an exchange lens, has been attached to or removed from the camera body 11. This process is periodically performed as Bucom 150 repeatedly communicates with the Lucom 205.

If it is determined in Step S101 that the lens unit 12 has been attached to the camera body 11, that is, if YES in Step S102, the process goes from Step S102 to Step S103. In Step S103, a dust-shielding process (removal of dust) is carried out. The nonvolatile memory 129 stores the count value to be set to the N-scale counter 241 in order to vibrate the dust filter 21 at resonance frequency (f1) for primary vibration. Assume that the nonvolatile memory 129 keeps storing this count value for a period (T0) of vibrating the dust filter 21. In the present embodiment, the dust-shielding process is performed on the basis of this data.

If it is determined in Step S101 that the lens unit 12 has not been attached to the camera body 11, that is, if NO in Step S102, the process goes from Step S102 to Step S104. Step S104 is to monitor the camera-operating switches SW 152 periodically. In Step S105, it is determined whether the photographing-mode selecting SW, which is one of the camera-operating switches SW 152, has been operated or not. If it is determined that the photographing-mode selecting SW has been operated, the process goes from Step S105 to Step S106.

In Step S106, it is determined whether the rapid-sequence photographing mode has been selected. If NO, the camera is set in the rapid-sequence photographing mode. If YES, the camera is released from the rapid-sequence photographing mode. In the rapid-sequence photographing mode, the camera keeps on taking pictures one after another, as long as the release switch SW remains on. The rapid-sequence photographing continues until the user release the release switch SW or the memory is filled up with image data. If the camera is not set in the rapid-sequence photographing mode, only one picture is taken even if the user pushes the release switch SW; pictures would not be taken one after another. To perform another photographing process, the user needs to release the release switch SW and then pushes the release switch SW.

If it is determined in Step S105 that the photographing-mode selecting SW has not been operated, the process goes to Step S107. In Step S107, it is determined whether the 1st release SW, which is one of the camera-operating switches SW 152, has been operated. If the 1st release SW has been operated, the process goes to Step S108. If the 1st release SW has not been operated, the process returns to Step S101.

In Step S108, luminance information about the object is acquired from the photometry circuit 121. From this information, an exposure time (Tv value) and a diaphragm-opening value (Av value) are calculated for the imaging element 27 and the lens unit 12, respectively.

In Step S109, the data generated by the AF sensor unit 116 is acquired via the AF-sensor drive circuit 117. From this data, Bucom 150 computes the defocusing degree.

In Step S110, it is determined whether the defocusing degree computed falls within a tolerance range. If NO, the process goes to Step S111. In Step S111, a drive control is carried out on the photographing lens incorporated in the photographing optical system 12a. The process then returns to Step 1f the defocusing degree computed falls within the tolerance range, the process goes to Step S112.

In Step S112, it is determined whether the 2nd release SW, which is one of the camera-operating switches SW 152, has been operated. If the 2nd release SW has been operated, the process goes to Step S113. If NO, the process returns to Step S101.

In Step S113, it is determined whether the photographing mode set is the rapid-sequence photographing mode or not. If NO, the mode is not the rapid-sequence photographing mode, the process goes to Step S115 to perform dust shielding before the object is photographed. If the rapid-sequence photographing mode is not set, the interval between a photographing operation and the next photographing operation is long, raising the probability that dust and the like stick to the dust filter 21. It is why dust shielding is carried out prior to any photographing operation.

If it is determined in Step S113 that the rapid-sequence photographing mode has been set, the process goes from Step S113 to Step S114. In Step S114, the release SW may be operated in the rapid-sequence photographing mode. Then, it is determining whether the photographing operation is to be performed for the first time. If YES, it is necessary to effect dust shielding before the photographing operation is carried out. Thus, the process goes to Step S115. In Step S115. If the photographing operation is to be performed for the second time or any following time, the process goes to Step S116.

In Step S116, it is determined whether the exposure time is longer than a predetermined time, in accordance with the exposure time (Tv value) already calculated in Step S108. If the exposure time is longer than the predetermined time, the process goes to Step S115 to carry out the dust shielding. If the exposure time is shorter than the predetermined time, dust shielding is prohibited and the process goes to Step S117.

It is desired that the photographing operation be continuously repeated at short intervals in the rapid-sequence photographing mode. It is therefore undesirable to perform dust shielding every time the photographing operation is carried out. The continuously repeated photographing operation imposes a great load on the battery that supplies power in the camera system. Therefore, no dust shielding is effected for the second photographing operation et esq. in the first embodiment. Nonetheless, dust shielding is carried out in the case where the exposure time is long, making the photographing intervals long. This is why Step S116 is performed.

In Step S117, the diaphragm opening is controlled for the photographing lens, in accordance with the Av value already calculated. Further, the shutter 14 is controlled on the basis of the Tv value. Thus, the imaging element 27 is exposed to light and generates image data.

In Step S118, the image data thus generated is converted to one in a prescribed format, which is stored in the recording medium. Then, the process returns to Step S101.

Among the electronic still cameras recently developed are those that have a simple moving-picture photographing function (MJPEG). The present embodiment can be applied to a camera of this type. In this case, dust shielding is effected for each photographing operation in the still-picture photographing mode. In the moving-picture photographing mode, dust shielding is performed only once before the first photographing operation.

In the first embodiment described above, dust shielding is effected before none of the photographing operations, but the first photographing operation, in the rapid-sequence photographing mode. This can shorten the photographing intervals when the rapid-sequence photographing is carried out.

SECOND EMBODIMENT

Figure 16:
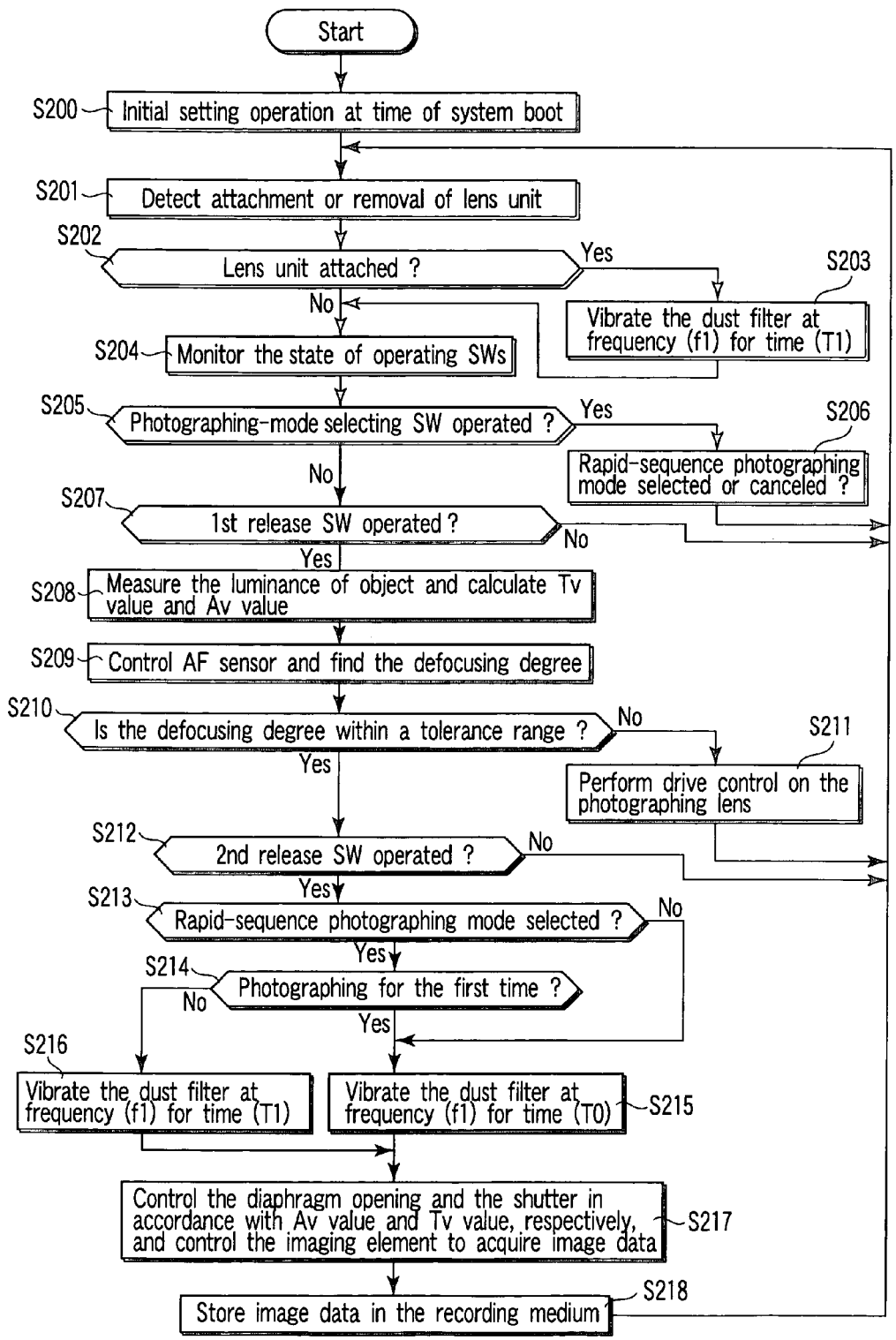
FIG. 16 is a flowchart explaining how Bucom 150 operates in a camera system according to a second embodiment of the invention.

FIG. 16 is a flowchart explaining how Bucom 150 operates in a camera system according to a second embodiment of the invention.

Bucom 150 starts operating when the user operates the power-supply SW on the camera. In Step S200, a process of booting the camera system is carried out. The power-supply circuit is controlled, supplying power to the circuit units of the camera system. Also, the circuit units are initialized.

Step S201 is performed to detect that the lens unit 12 is attached to the camera body 11. More specifically, Bucom 150 periodically communicates with Lucom 205 to determine whether the lens unit has been attached to the camera body.

That is, if it is detected in Step S201 that the lens unit 12 has been attached to the camera body 11, it is YES in Step S202. Thus, the process goes from Step S202 to Step S203, in which dust shielding (i.e., removal of dust) is effected. The nonvolatile memory 129 stores the count value to be set in the N-scale counter, which is used to make the dust filter 21 undergo primary vibration at the resonance frequency (f1). The nonvolatile memory 129 also stores the data representing a period (T0) of vibrating the dust filter 21. On the basis of the count value and the period (T0), both stored in the memory 129, the dust shielding is carried out in the present embodiment.

If it is detected in Step S201 that the lens unit 12 has not been attached to the camera body 11, it is NO in Step S202. Then, the process goes from Step S202 to Step S204. In Step S204, the camera-operating switches SW 152 are periodically monitored. In Step S205 it is determined whether the photographing-mode selecting SW, which is one of the camera-operating switches SW 152, has been operated or not. If it is determined that the selecting switch SW has been operated, the process goes from Step S205 to Step S206.

In Step S206, the camera is set in the rapid-sequence photographing mode if this mode has not been selected so far. If the camera has already been set in the rapid-sequence photographing mode has already been set, it is released from this mode.

If it is not determined in Step S205 that the selecting switch SW has been operated, the process goes to Step S207. In Step S207, it is determined whether the 1st release SW, which is one of the camera-operating switches SW 152, has been operated. If the 1st release SW has been operated, the process goes to Step S208. If the 1st release SW has not been operated, the process returns to Step S201.

In Step S208, the luminance information about the object is acquired from the photometry circuit 121. From this information, an exposure time (Tv value) and a diaphragm-opening value (Av value) are calculated for the imaging element 27 and the lens unit 12, respectively.

In Step S209, the data generated by the AF sensor unit 116 is acquired via the AF-sensor drive circuit 117. From this data, Bucom 150 computes the defocusing degree.

In Step S210, it is determined whether the defocusing degree computed falls within a tolerance range. If NO, the process goes to Step S211. In Step S211, a drive control is carried out on the photographing lens incorporated in the photographing optical system 12a. The process then returns to Step S201.

If the defocusing degree computed falls within the tolerance range, the process goes to Step S212.

In Step S212, it is determined whether the 2nd release SW, which is one of the camera-operating switches SW 152, has been operated. If the 2nd release SW has been operated, the process goes to Step S213. If NO, the process returns to Step S201.

In Step S213, it is determined whether the photographing mode set is the rapid-sequence photographing mode or not. If the mode is not the rapid-sequence photographing mode, the process goes to Step S215 to perform dust shielding before the object is photographed. The conditions in which the dust shielding is effected are the same as in Step S203 already explained.

If it is determined in Step S213 that the rapid-sequence photographing mode has been set, the process goes from Step S213 to Step S214. In Step S214, the release SW may be operated in the rapid-sequence photographing mode. Then, it is determining whether the photographing operation is to be performed for the first time. If YES, it is necessary to effect dust shielding reliably before the photographing operation is carried out. Thus, the process goes to Step S215. In Step S215, dust shielding is effected in the same conditions as in Step S203. Note that Step S203 is performed when the lens unit 12 is attached to the camera body. Before the lens unit 12 is attached, the dust filter 21 is exposed outside and contacts the outside air. It is quite probable that large dust particles or dust not easy to remove stick to the dust filter. Therefore, a dust-shielding time is set, which is long enough to remove dust reliably in Step S203. The process goes from Step S215 to Step S217.

If it is determined in Step S214 that the photographing operation is to be performed for the second time or any following time, the process goes to Step S216.

The time T1 for which the dust shield is effected in Step S216 is shorter than the time T0 for which dust shielding is performed in Step S215. In the rapid-sequence photographing mode, it is desired that the photographing be continuously repeated at short intervals. In view of this, it is not desirable to remove dust thoroughly every time photographing carried out. If the dust is completely removed at the first photographing in the rapid-sequence photographing mode, no prominent problem will arise even if the dust shielding is effected for a short time at the second photographing et seq. This is because the possibility is small that dust hard to remove sticks to the dust filter during the short period between one photographing and the next photographing. The process then goes from Step S216 to Step S217.

In Step S217, the diaphragm opening is controlled for the photographing lens, in accordance with the Av value already calculated. Further, the shutter 14 is controlled on the basis of the Tv value. Thus, the imaging element 27 is exposed to light and generates image data.

In Step S218, the image data thus generated is converted to one in a prescribed format. The image data thus converted is stored in the recording medium. Then, the process returns to Step S201.

In the second embodiment described above, dust shielding is performed on the dust filter 21 in the rapid-sequence photographing mode, first for the predetermined time (T0) before the first photographing and then for the other predetermined time (T1) shorter than the time (T0) before each succeeding photographing. This can shorten the intervals at which photographing operation is repeated in the rapid-sequence photographing mode.

The period of vibrating the dust filter 21 may be changed, as is needed, in accordance with the number of times the photographing is repeated in the rapid-sequence photographing mode.

THIRD EMBODIMENT

Figure 17:
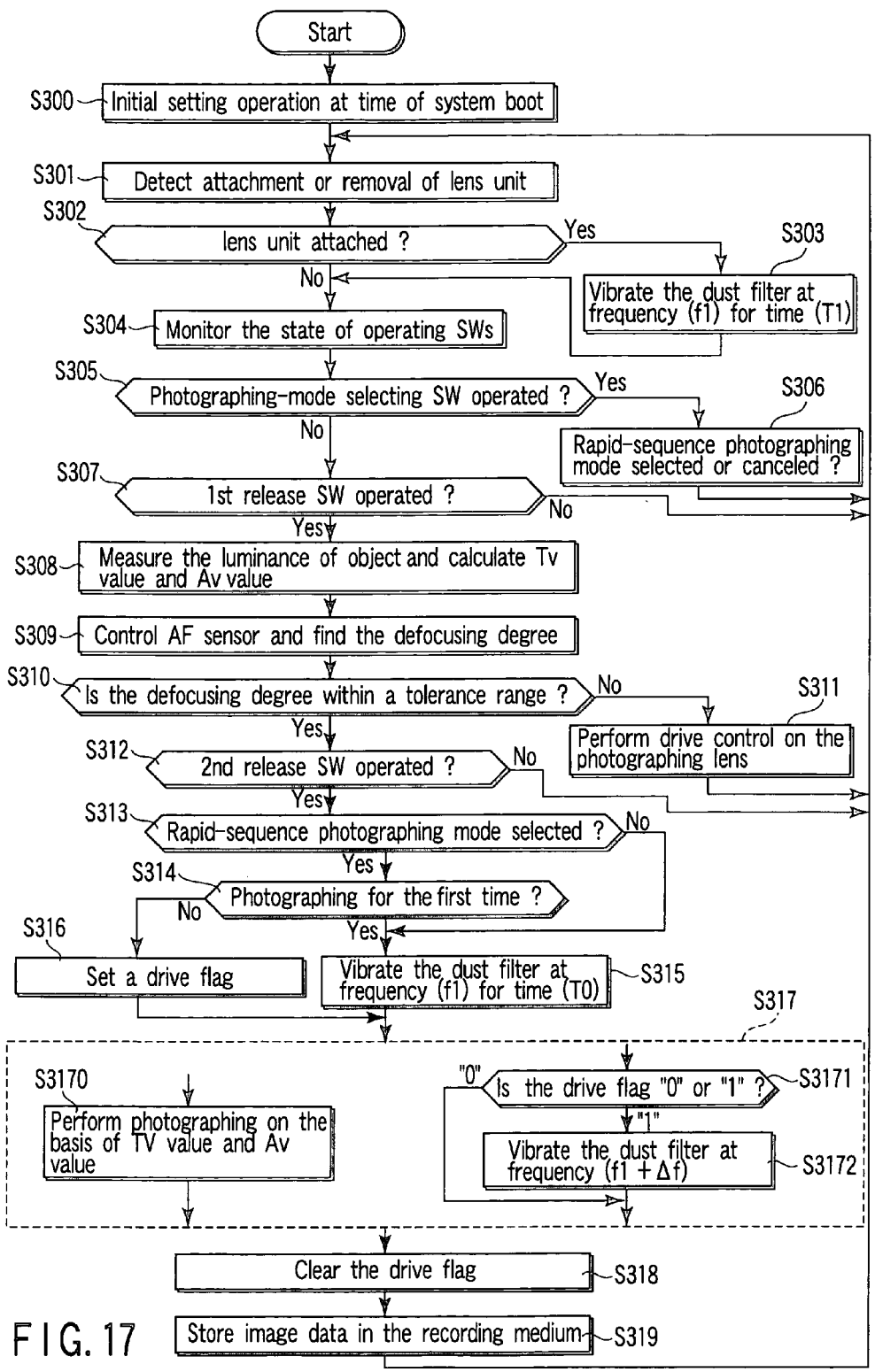
FIG. 17 is a flowchart explaining how Bucom 150 operates in a camera system according to a third embodiment of this invention.

FIG. 17 is a flowchart explaining how Bucom 150 operates in a camera system according to a third embodiment of this invention.

Bucom 150 starts operating when the user operates the power-supply SW on the camera. In Step S300, a process of booting the camera system is carried out. The power-supply circuit 153 is controlled, supplying power to the circuit units of the camera system. Also, the circuit units are initialized.

Step S301 is performed to detect that the lens unit 12 is attached to the camera body 11. More specifically, Bucom 150 periodically communicates with Lucom 205 to determine whether the lens unit has been attached to the camera body.

That is, it is determined in Step S302 whether the lens unit 12 has been attached to the camera body 11. If YES in Step S302, the process goes from Step S302 to Step S303, in which dust shielding (i.e., removal of dust) is effected. The nonvolatile memory 129 stores the count value to be set in the N-scale counter, which is used to make the dust filter 21 undergo primary vibration at the resonance frequency (f1). The nonvolatile memory 129 also stores the data representing a period (T0) of vibrating the dust filter 21. On the basis of the count value and the period (T0), both stored in the memory 129, the dust shielding is carried out.

In Step S302, it is determined whether the lens unit 12 is attached to the camera body 11. If NO in Step S302, the process goes from Step S302 to Step S304. In Step S304, the camera-operating switches SW 152 are periodically monitored. In Step S305 it is determined whether the photographing-mode selecting SW, which is one of the camera-operating switches SW 152, has been operated or not. If it is determined that the selecting switch SW has been operated, the process goes from Step S305 to Step S306.

In Step S306, the camera is set in the rapid-sequence photographing mode if this mode has not been selected so far. If the camera has already been set in the rapid-sequence photographing mode has already been set, it is released from this mode.

If it is not determined in Step S305 that the selecting switch SW has been operated, the process goes to Step S307. In Step S307, it is determined whether the 1st release SW, which is one of the camera-operating switches SW 152, has been operated. If the 1st release SW has been operated, the process goes to Step S308. If the 1st release SW has not been operated, the process returns to Step S301.

In Step S308, the luminance information about the object is acquired from the photometry circuit 121. From this information, an exposure time (Tv value) and a diaphragm-opening value (Av value) are calculated for the imaging element 27 and the lens unit 12, respectively.

In Step S309, the data generated by the AF sensor unit 116 is acquired via the AF-sensor drive circuit 117. From this data, Bucom 150 computes the defocusing degree.

In Step S310, it is determined whether the defocusing degree computed falls within a tolerance range. If NO, the process goes to Step S311. In Step S311, a drive control is carried out on the photographing lens incorporated in the photographing optical system 12a. The process then returns to Step S301.

If the defocusing degree computed falls within the tolerance range, the process goes to Step S312. In Step S312, it is determined whether the 2nd release SW, which is one of the camera-operating switches SW 152, has been operated. If the 2nd release SW has been operated, the process goes to Step S313. If NO, the process returns to Step S301.

In Step S313, it is determined whether the photographing mode set is the rapid-sequence photographing mode or-not. If the mode is not the rapid-sequence photographing mode, the process goes to Step S315 to perform dust shielding before the photographing is performed. The conditions in which the dust shielding is effected are the same as in Step S303 already explained.

If it is determined in Step S313 that the rapid-sequence photographing mode has been set, the process goes from Step S313 to Step S314. In Step S314, the release SW may be operated in the rapid-sequence photographing mode. Then, it is determining whether the photographing operation is to be performed for the first time. If YES, it is necessary to effect dust shielding reliably before the photographing operation is carried out. Thus, the process goes to Step S315. In Step S315, dust shielding is effected in the same conditions as in Step S303.

In Step S314 it may be determined that the photographing operation is to be performed for the second time or for any time after the second time. If so, the process goes to Step S316. In Step S316, a drive flag, which is a control flag, is set. While this flag remains set, dust shielding is effected during the photographing operation. In the rapid-sequence photographing mode, it is desired that photographing be repeated at short intervals. This is why the dust shielding is not performed between one photographing operation and the next photographing operation. Otherwise, the photographing intervals will increase, which is not undesirable.

Dust shielding is effected while photographing is performed for the second time or for any other time succeeding the second. The dust filter 21 may deform greatly by the dust shielding repeated, however. In this case, the aberration of the photographing lens increases, inevitably degrading the image quality. It is therefore necessary to vibrate the dust filter 21, minimizing the deformation thereof, while the imaging element 27 is being exposed to light. The mode of the photographing operation performed in Step S317 depends on whether a dive flag is set or not. If no drive flag is set, only Step S3170 is carried out.

In Step S3170, the diaphragm opening is controlled for the photographing lens, in accordance with the Av value already calculated. Further, the shutter 14 is controlled on the basis of the Tv value. Thus, the imaging element 27 is exposed to light and generates image data.

If a drive flag is set, dust shield is effected while Step S3170 is being carried out. The drive frequency used in the dust shielding performed in Step S3170 should be deviated from the resonance frequency (f1) that is determined by the shape of the dust filter 21. Once the drive frequency has been deviated from f1, the deformation of the dust filter 21 can be reduced. $\Delta f$ is the deviation. Any other method of vibrating may be employed if the deformation of the dust filter 21 is small.

The dust filter 21 may be vibrated at the resonance frequency (f2) for secondary vibration. The amplitude at which the dust filter 21 undergoes secondary vibration is smaller than the amplitude at which it undergoes primary vibration. Moreover, the dust filter 21 may be subjected to vibration of any higher order.

Upon completion of the photographing operation, the drive flag is cleared in Step S318. In Step S319, the image data is converted to one in a prescribed format. The image data thus converted is stored in the recording medium. Then, the process returns to Step S301.

In the third embodiment described above, dust shielding is performed on the dust filter 21 in a specific manner in the rapid-sequence photographing mode. That is, the dust shielding is effected, first before the photographing operation is carried out for the first time, and then at a different driven frequency (f1+$\Delta f$) while the photographing operation is performed for the second time or for any other time succeeding the second. This can shorten the intervals at which photographing is carried out in the rapid-sequence photographing mode.

FOURTH EMBODIMENT

Figure 18:
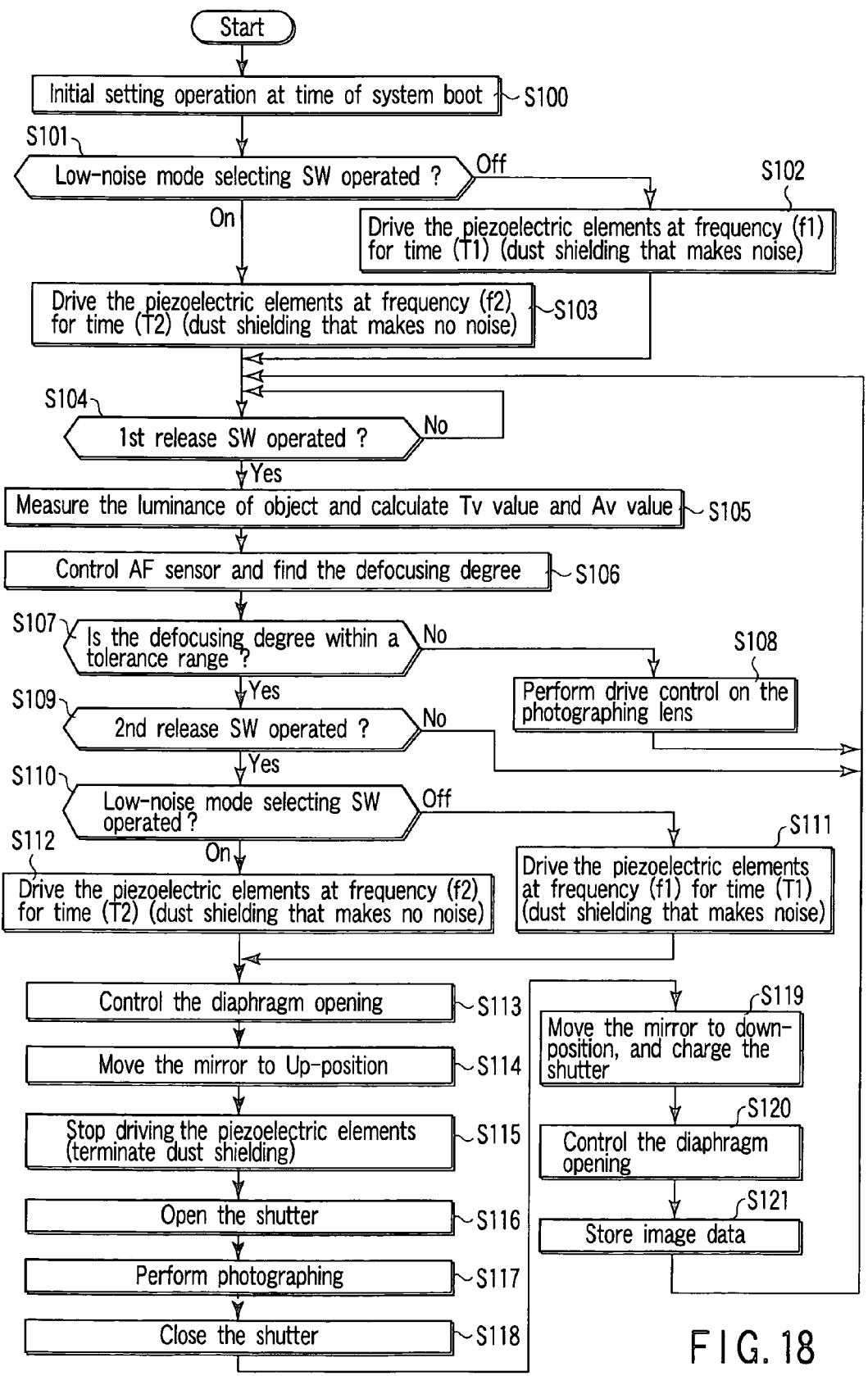
FIG. 18 is a flowchart explaining how Bucom 150 operates in a camera system according to a fourth embodiment of the invention.

FIG. 18 is a flowchart explaining how Bucom 150 operates in a camera system according to a fourth embodiment of the invention.

Bucom 150 starts operating when the user operates the power-supply SW on the camera. In Step S100, a process of booting the camera system is carried out. The power-supply circuit 153 is controlled, supplying power to the circuit units of the camera system. Also, the circuit units are initialized.

Step S101, Step 102 and Step S103, a process of removing dust is carried out when the camera system is activated. This is because dust may stick to the dust filter 21 for some reason (for example, because the user changes the photographing lens to another).

In Step S101, it is determined whether a low-noise mode selecting SW, which is one of the camera-operating switches SW 152, has been turned on. If ON, the low-noise operating mode is selected, and the noise made at the time of photographing is reduced. More precisely, the operating speed of the actuator is lowered, suppressing the mechanical noise the actuator makes. Further, aural messages (e.g., an alarm indicating that the power in the battery is running out, a pseudo shutter-release sound informing that the photographing has completed, a message informing that the focusing has achieved) are not generated at all. In the low-noise operating mode, the noise that may be made at the dust filter 21 as dust is removed from the filter 21 must be suppressed, too.

If it is determined in Step S101 that the low-noise operating mode is not selected, the process goes from Step S101 to Step S102. In Step S102, dust shielding is effected on the dust filter 21. The nonvolatile memory 129 stores the count value to be set in the N-scale counter, which is used to make the dust filter 21 undergo primary vibration at the resonance frequency (f1). The nonvolatile memory 129 also stores the data representing a period (T1) of vibrating the dust filter 21 to remove dust therefrom. The dust filter 21 is vibrated at the frequency f1, in such a way as is illustrated in FIG. 7 and FIG. 8. That is, all parts of the dust filter 21 vibrate in the same phase. The user can hear the sound the filter 21 generates if the frequency f1 falls within the audible range. Since the low-noise operating mode is not selected, this sound enables the user to know that the dust shielding is proceeding. In Step S102, dust shielding is effected, vibrating the dust filter 21 at frequency f1 for period T1, which generates sound.

If it is determined in Step S101 that the low-noise operation mode is selected, the process goes from Step S101 to Step S103. In Step S103, dust shielding is performed on the dust filter 21 in the same way as in Step S102. Two control parameters (f2, T2) are read from the nonvolatile memory 129. Note that f2 is different from f1 (it is a frequency higher than f1). The higher the drive frequency, the smaller the amplitude of vibration. Hence, the period T2 of vibrating the filter 21 at frequency f2 to remove dust and the like completely from the filter 21 must be longer than the period T1 of vibrating the filter 21 at frequency f1. In Step S103, the dust filter 21 is vibrated in accordance with these control parameters, thereby achieving noiseless dust shielding. If vibrated at f2, the dust filter 21 assumes such a vibration mode as shown in FIG. 10 and FIG. 11, not in the mode illustrated in FIG. 7 and FIG. 8. That is, all parts of the dust filter 21 do not vibrate in the same phase. As can be understood from FIGS. 10 and 11, the vibration phase at the center of the filter 21 and that at the periphery thereof differ by 180° from each other. Thus, the sound generated at the center and the sound generated at the periphery cancel out each other. The user therefore hears no sound during the dust shielding, though f2 falls within the audible range. The glass disc that constitutes the dust filter 21 can vibrates in many modes. In any mode other than the mode illustrated in FIG. 8 and FIG. 9, sound cannot be radiated well because all parts of the dust filter 21 do not vibrate in the same phase. Accordingly, the filter 21 need not be vibrated exclusively at frequency f1 in the low-noise operating mode, unless all parts of the dust filter 21 are not vibrated in the same phase.

The process goes from Step S102 or Step S103 to Step S104. In Step S104, it is determined whether the 1st release SW, which is one of the camera-operating switches SW 152, has been operated. Step S104 is repeated until it is determined that the 1st release SW has been operated. If the 1st release SW is operated, the process goes from Step S104 to Step S105. In Step S105, the luminance information about the object is acquired from the photometry circuit 121. From this information, an exposure time (Tv value) and a diaphragm-opening value (Av value) are calculated for the imaging element 27 and the lens unit 12, respectively.

In Step S106, the data generated by the AF sensor unit 116 is acquired via the AF-sensor drive circuit 117. From this data, Bucom 150 computes the defocusing degree.

In Step S107, it is determined whether the defocusing degree computed falls within a tolerance range. If NO, the process goes to Step S108. In Step S108, a drive control is carried out on the photographing lens incorporated in the photographing optical system 12a. The process then returns to Step S104.

If it is determined in Step S107 that the defocusing degree computed falls within the tolerance range, the process goes to Step S109. In Step S109, it is determined whether the 2nd release SW, which is one of the camera-operating switches SW 152, has been operated. If the 2nd release SW has been operated, the process goes to Step S110. If NO, the process returns to Step S104.

In Step S110, it is determined whether a low-noise mode selecting SW has been turned on. If the low-noise operating mode is not selected, the process goes to Step S111. In Step S111, dust shielding is effected, making noise, before a photographing operation is carried out. Step S111 is identical to Step S102 that has been explained above. The dust shielding is effected while some steps (Step S113 and Step S114) are performed in preparation for photographing operations.

If it is determined in Step S110 that the low-noise operation mode has been selected, the process goes to Step S112. In Step S112, noiseless dust shielding is started. Step S112 is identical to Step S103.

In Step S113, the diaphragm opening is controlled for the photographing lens in the photographing optical system 12a, in accordance with the Av value already calculated in Step 105.

In Step S114, the quick-return mirror 13b is driven to the Up-position.

In Step S115, the piezoelectric elements 22 are stopped to terminate the dust shielding. Therefore, the dust filter 21 stops vibrating.

In Step S116, the shutter 14 is opened. The imaging element 27 is therefore exposed to light on the basis of the Tv value. Thus, photographing is thereby carried out.

In Step S118, the shutter 14 is closed. In Step S119, the quick-return mirror 13b is driven to the Down-position, and the shutter 14 is charged.

In Step S120, the diaphragm for the photographing lens is opened in the photographing optical system 12a. In Step S121, the image data generated by the imaging element 27 is converted to one in a prescribed format. The image data thus converted is stored in the recording medium.

In the fourth embodiment described above, noiseless dust shielding is carried out while the camera remains in the low-noise operating mode. Thus, the dust shielding can be effected, without making noise that may annoy the user.

FIFTH EMBODIMENT

Figure 19:
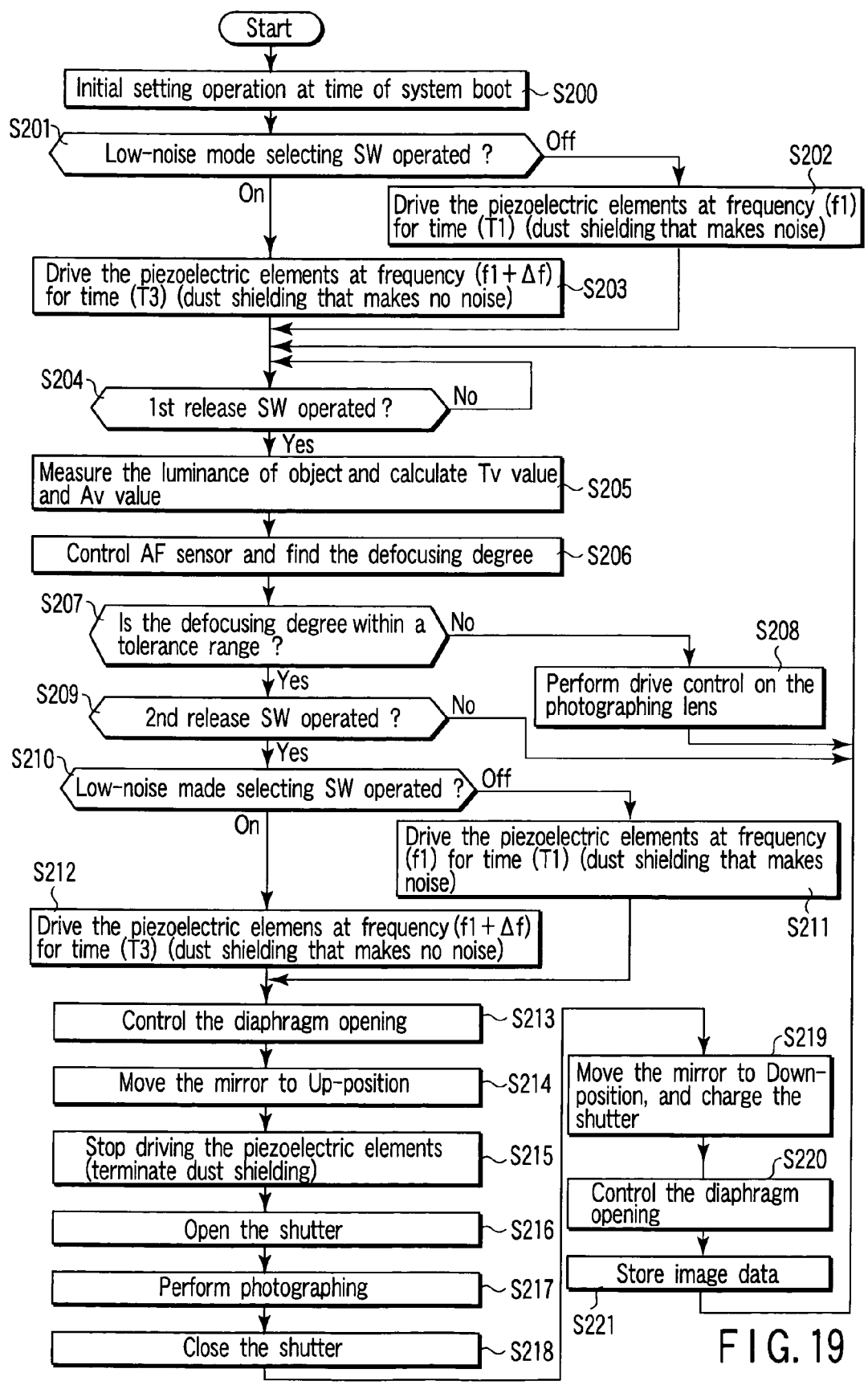
FIG. 19 is a flowchart explaining how Bucom 150 operates in a camera system according to a fifth embodiment of the invention.

FIG. 19 is a flowchart explaining how Bucom 150 operates in a camera system according to a fifth embodiment of the invention.

Bucom 150 starts operating when the user operates the power-supply SW on the camera is turned on. In Step S200, a process of booting the camera system is carried out. The power-supply circuit 153 is controlled, supplying power to the circuit units of the camera system. Also, the circuit units are initialized.

Step S201, Step 202 and Step S203, a process of removing dust is carried out when the camera system is activated. This is because dust may stick to the dust filter 21 for some reason (for example, because the user changes the photographing lens to another).

In Step S201, it is determined whether a low-noise mode selecting SW, which is one of the camera-operating switches SW 152, has been turned on. If ON, the low-noise operating mode is selected, and the noise made at the time of photographing is reduced. More precisely, the operating speed of the actuator is lowered, suppressing the mechanical noise the actuator makes. Further, aural messages (e.g., an alarm indicating that the power in the battery is running out, a pseudo shutter-release sound informing that the photographing has completed, a message informing that the focusing has achieved) are not generated at all. In the low-noise operating mode, the noise that may be made at the dust filter 21 as dust is removed from the filter 21 is suppressed, too.

If it is determined in Step S201 that the low-noise operating mode is not selected, the process goes from Step S201 to Step S202. In Step S102, dust shielding is effected on the dust filter 21. The nonvolatile memory 129 stores the count value to be set in the N-scale counter, which is used to make the dust filter 21 undergo primary vibration at the resonance frequency (f1). The nonvolatile memory 129 also stores the data representing a period (T1) of vibrating the dust filter 21 to remove dust therefrom. The dust filter 21 is vibrated at the frequency f1, in such a way as is illustrated in FIG. 7 and FIG. 8. That is, all parts of the dust filter 21 vibrate in the same phase. The user can hear the sound the filter 21 generates if the frequency f1 falls within the audible range. Since the low-noise operating mode is not selected, this sound enables the user to know that the dust shielding is proceeding. In Step S202, dust shielding is effected, vibrating the dust filter 21 at frequency f1 for period T1, which generates sound.

If it is determined in Step S201 that the low-noise operation mode is selected, the process goes from Step S201 to Step S203. In Step S203, dust shielding is performed on the dust filter 21 in the same way as in Step S202. Three control parameters (f1, $\Delta$f, T3) are read from the nonvolatile memory 129. In accordance with these parameters, the dust filter is driven. f1 is resonance frequency of primary vibration. $\Delta$f is a deviation from frequency f1.

FIG. 12 represents the relation between the frequency at which the dust filter is driven and which is close to the resonance frequency and the amplitude at which the dust filter is vibrated. If the drive frequency is deviated from the resonance frequency, the amplitude will decrease, and the sound pressure will decrease, too. This is why the drive frequency is deviated from the resonance frequency by a prescribed value $\Delta$f in the low-noise operation mode. Thus, substantially noiseless dust shielding is carried out. Since the amplitude of vibration decreases, the dust cannot be removed so effectively. To remove the dust thoroughly, the dust filter is driven for a period T3 that differs from period T1 for which the dust filter is vibrated at resonance frequency f1.

The process goes from Step S202 or Step S203 to Step S204. In Step S204, it is determined whether the 1st release SW, which is one of the camera-operating switches SW 152, has been operated. Step S204 is repeated until it is determined that the 1st release SW has been operated. If the 1st release SW is operated, the process goes from Step S304 to Step S205. In Step S205, the luminance information about the object is acquired from the photometry circuit 121. From this information, an exposure time (Tv value) and a diaphragm-opening value (Av value) are calculated for the imaging element 27 and the lens unit 12, respectively.

In Step S206, the data generated by the AF sensor unit 116 is acquired via the AF-sensor drive circuit 117. From this data, Bucom 150 computes the defocusing degree.

If it is determined in Step S207 that the defocusing degree computed does not fall within the tolerance range, the process goes to Step S208. In Step S208, the photographing lens is driven in the photographing optical system 12a. Then, the process returns to Step S204.

If it is determined in Step S207 that the defocusing degree computed falls within the tolerance range, the process goes to Step S209. In Step S209, it is determined whether the 2nd release SW, which is one of the camera-operating switches SW 152, has been operated. If the 2nd release SW has been operated, the process goes to Step S210. If NO, the process returns to Step S204.

In Step S210, it is determined whether a low-noise mode selecting SW has been turned on. If the low-noise operating mode is not selected, the process goes to Step S211. In Step S211, dust shielding is effected, making noise, before a photographing operation is carried out. Step S211 is identical to Step S202 that has been explained above. The dust shielding is effected while some steps (Step S213 and Step S214) are performed in preparation for photographing operations.

If it is determined in Step S210 that the low-noise operation mode has been selected, the process goes from Step S210 to Step S212. In Step S212, noiseless dust shielding is started. Step S212 is identical to Step S203.

In Step S213, the diaphragm opening is controlled for the photographing lens in the photographing optical system 12a, in accordance with the Av value already calculated in Step S205.

In Step S214, the quick-return mirror 13b is driven to the Up-position.

In Step S215, the piezoelectric elements 22 are stopped. The dust shielding is therefore terminated. Therefore, the dust filter 21 stops vibrating.

In Step S216, the shutter 14 is opened. In Step S217, the imaging element 27 is exposed to light on the basis of the Tv value. Thus, photographing is thereby carried out.

In Step S218, the shutter 14 is closed. In Step S219, the quick-return mirror 13b is driven to the Down-position. Further, the shutter 14 is charged. In Step S220, the diaphragm for the photographing lens is driven to an opened position. In Step S221, the image data generated by the imaging element 27 is converted to one in a prescribed format. The image data thus converted is stored in the recording medium.

In the fifth embodiment described above, the drive frequency is deviated from the resonance frequency in the low-noise operating mode, thereby suppressing generation of sound. Thus, the dust shielding can be effected, virtually not making noise that may annoy the user.

SIXTH EMBODIMENT

In the fourth and the fifth embodiment, the dust filter 21 is vibrated in the low-noise operating mode, not making sound that man can hear. Even in the low-noise operating mode, the dust shielding is not stopped. In the sixth embodiment, the dust shielding is stopped as long as the camera is set in the low-noise operating mode. To decrease the probability that dust sticks to the dust filter 21 in this operating mode, the quick-return mirror 13b is moved to the Up-position.

Generally, the quick-return mirror 13b is moved to the Up-position and back to the Down-position every time an exposure operation is carried out. In this embodiment, the quick-return mirror 13b is moved to, and fixed at, the Up-position when the camera is set in the low-noise operating mode. After the quick-return mirror 13b is so fixed in position, air is not stirred in the mirror box. Therefore, dust does not rise. This minimizes the possibility that the dust sticks to the dust filter 21. In addition, the quick-return mirror 13b does not make mechanical noise that it would make if it were moved to the Up-position and back to the Down-position. Thus, the camera scarcely makes noise while set in the low-noise operating mode.

Figure 20:
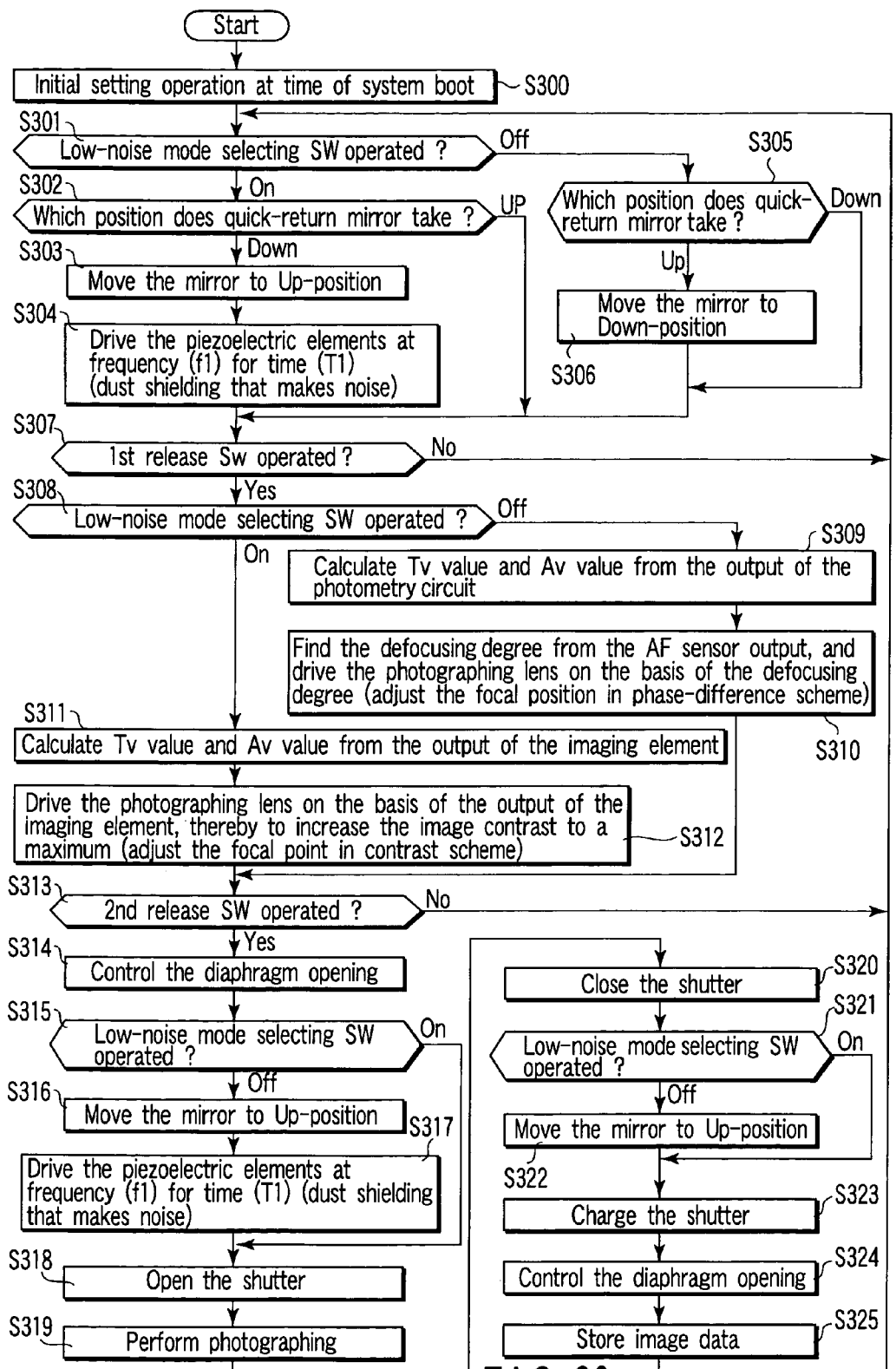
FIG. 20 is a flowchart explaining how Bucom 150 operates in a camera system according to a sixth embodiment of this invention.

How Bucom 150 operates in a camera system according to the sixth embodiment of the invention will be explained with reference of the flowchart of FIG. 20. Bucom 150 starts operating when the user operates the power-supply SW on the camera is turned on. In Step S300, a process of booting the camera system is carried out. The power-supply circuit 153 is controlled, supplying power to the circuit units of the camera system. Also, the circuit units are initialized.

In Step S301, it is determined whether a low-noise mode selecting SW, which is one of the camera-operating switches SW 152, has been turned on. If ON, the low-noise operating mode is selected. If ON, the process goes from Step S301 to Step S302. In Step S302, it is determined which position the quick-return mirror 13b takes, Up-position or Down-position. If the quick-return mirror 13b is in the Down-position, it means that low-noise mode selecting SW has just been turned on. In this case, the process goes from Step S302 to Step S303. In Step S303, the quick-return mirror 13b is driven to the Up-position. Once the quick-return mirror 13b has been set in the Up-position, the finder assumes a blackout state. The user can no longer see the object through the finder. In this condition, the user needs to use the liquid crystal monitor 124 to observe the object.

Therefore, the user opens the shutter 14. Then, the imaging element 27 generates image data, from which a video signal is generated. The video signal is supplied to the liquid crystal monitor 124, which displays an image of the object. This sequence of operation will not be described in detail.

Next, the process goes to Step S304. In Step S304, dust shielding is performed on the dust filter 21. The nonvolatile memory 129 stores the count value to be set in the N-scale counter, which is used to make the dust filter 21 undergo primary vibration at the resonance frequency (f1). The nonvolatile memory 129 also stores the data representing a period (T1) of vibrating the dust filter 21 to remove dust therefrom. The dust filter 21 is vibrated at the frequency f1, in such a way as is illustrated in FIG. 7 and FIG. 8. That is, all parts of the dust filter 21 vibrate in the same phase. The user can hear the sound the filter 21 generates if the frequency f1 falls within the audible range. Sound is generated as the dust shielding proceeds. Nonetheless, no problem will arise since no dust shielding is effected again in the low-nose operating mode. Here, noiseless dust shield is not carried out as in the fourth embodiment and the fifth. This is because the sound the dust shielding generates is used, informing the user that the operating mode of the camera has been changed to the low-noise operating mode.

If the camera has already been set in the low-noise operating mode and the quick-return mirror 13b is in the Up-position, neither Step S303 nor Step S304 needs to be carried out. In this case, the process goes from Step S302 to Step S307.

In Step S301 it may be determined that the low-noise mode selecting switch S is OFF. If so, the position of the quick-return mirror 13b is detected in Step S305. If the quick-return mirror 13b is in the Up-position, it means that low-noise mode selecting SW has just been turned off. Thus, in Step S306, the quick-return mirror 13b is moved back to the Down-position. As the quick-return mirror 13b is set at the Down-position, the finder comes out of the blackout state. The user can now observe the object through the finder. The process then goes to Step S307.

In Step S307, it is determined whether the 1st release SW, which is one of the camera-operating switches SW 152, has been operated. If the 1st release SW is ON, the process goes from Step S307 to Step S308. If the 1st release SW is OFF, the process returns to Step S301. In Step S308, the state of the low-noise mode selecting SW is detected. If the low-noise mode selecting switch SW is OFF, the process goes to Step S309.

In Step S309, the luminance information about the object is acquired from the photometry circuit 121. From this information, an exposure time (Tv value) and a diaphragm-opening value (Av value) are calculated for the imaging element 27 and the lens unit 12, respectively. In Step S210, focus adjustment of the phase-difference scheme known in the art is carried out. That is, the data generated by the AF sensor unit 116 is acquired via the AF-sensor drive circuit 117. From this data, Bucom 150 computes the defocusing degree. On the basis of the defocusing degree, the photographing lens is driven in the photographing optical system 12a. The process then goes to Step S313.

In Step S308, it may be determined that the low-noise operating mode has been selected. In this case, the process goes from Step S308 to Step S311. In Step S311, the luminance information about the object is detected from the output of the imaging element 27. From this information, an exposure time (Tv value) and a diaphragm-opening value (Av value) are calculated for the imaging element 27 and the lens unit 12, respectively. Since the quick-return mirror 13b is in the Up-position, the luminance information about the object cannot be acquired from the photometry circuit 121 that is arranged in the finder optical system.

In Step S312, focus adjustment of the known contrast scheme is carried out. Namely, the photographing lens is adjusted in position so that the image data read from the imaging element 27 represents an image of maximum contrast.

In Step S313, it is determined whether the 2nd release SW, which is one of the camera-operating switches SW 152, has been operated. If the 2nd release SW has been operated, the process goes to Step S314. If NO, the process returns to Step S301.

In Step S314, the diaphragm opening is controlled for the photographing lens in the photographing optical system 12a, in accordance with the Av value already calculated. It is determined whether the low-noise operating mode has been selected. If the low-noise operating mode has been selected, there is no need to drive the quick-return mirror 13b, and dust shielding is prohibited. Thus, the process goes from Step S315 to Step S318.

In Step S315 it may be determined that the low-noise operating mode has not been selected. In this case, the process goes to Step S316. In Step S316, the quick-return mirror 13b is moved to the Up-position. Then, in Step S317, dust shielding is carried out. The dust shielding effected in Step S317 is identical to the dust shielding performed in Step S304.

In Step S318, the shutter 14 is opened. In Step S319, the imaging element 27 is exposed to light on the basis of the Tv value. In Step S320, the shutter 14 is closed.

In Step S321, it is determined whether the low-noise operating mode has been selected. If the low-noise operating mode has been selected, it is unnecessary to move the quick-return mirror 13b to the Down-position. Accordingly, the process immediately goes to Step S323. If the low-noise operating mode has not been selected, the quick-return mirror 13b is driven to the Down-position, and the process goes to Step S323. In Step S323, the shutter 14 is charged.

In the next step, i.e., Step S324, the diaphragm for the photographing lens is driven to an opened position. In Step S325, the image data generated by the imaging element 27 is converted to one in a prescribed format. The image data thus converted is stored in the recording medium.

According to the sixth embodiment described above, no dust shielding is effected while the camera remains in the low-noise operating mode. Hence, the camera can perform photographing, not making noise that may annoy the user.

SEVENTH EMBODIMENT

Figure 21:
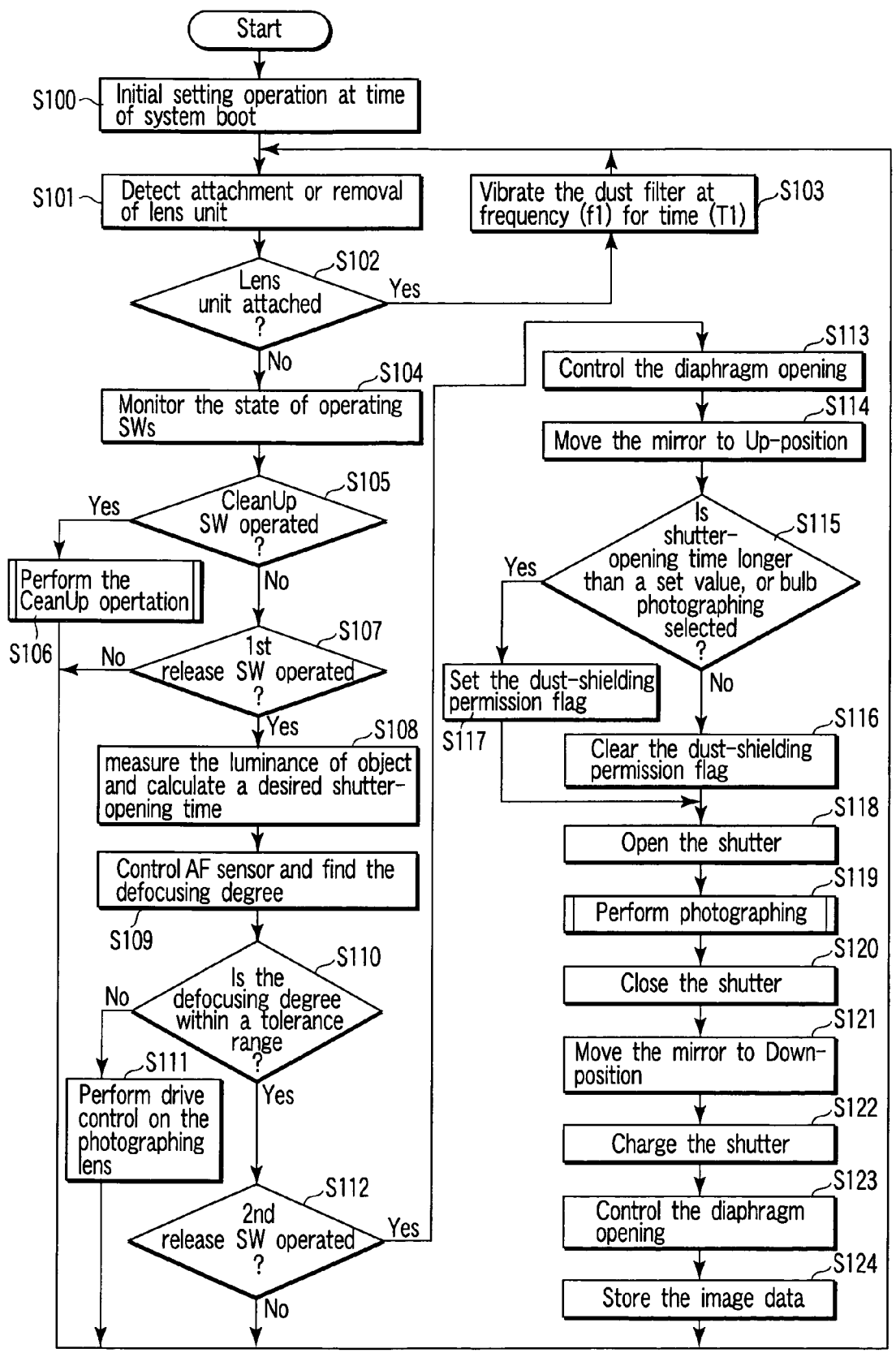
FIG. 21 is a flowchart explaining how Bucom 150 operates in a camera system according to a seventh embodiment of the invention.

FIG. 21 is a flowchart explaining how Bucom 150 operates in a camera system according to a seventh embodiment of the invention.

Bucom 150 starts operating when the user operates the power-supply SW on the camera is turned on. In Step S100, a process of booting the camera system is carried out. The power-supply circuit 153 is controlled, supplying power to the circuit units of the camera system. Also, the circuit units are initialized.

Step S101 is performed to detect that the lens unit 12 is attached to the camera body 11. More specifically, Bucom 150 periodically communicates with Lucom 205 to determine whether the lens unit has been attached to the camera body. If it is determined that the lens unit 12 has been attached to the camera body 11, the process goes from Step S102 to Step S103. In Step S103, the piezoelectric elements 22 mounted on the dust filter 21 are driven at frequency f1 for period T1. The nonvolatile memory 129 stores the count value to be set in the N-scale counter, which is used to make the dust filter 21 undergo primary vibration at the resonance frequency (f1). The nonvolatile memory 129 also stores the data representing a period (T1) of vibrating the dust filter 21 to remove dust therefrom. The dust shielding is performed in accordance with these data items. The dust filter 21 is vibrated at the frequency f1, in such a way as is illustrated in FIG. 7 and FIG. 8. Dust is thereby removed from the dust filter 21.

In Step S102 it may not be determined that the lens unit 12 has been attached to the camera body 11. If so, the process goes from Step S102 to Step S104. In Step S104, the camera-operating switches SW 152 are periodically monitored. In Step S105, it is determined whether the CleanUp SW, which is one of the camera-operating switches SW 152, has been operated. If the CleanUp SW has been operated, the process goes to Step S106. In Step S106, a subroutine "CleanUp operation" is carried out. The subroutine "CleanUp operation" will be described later in detail.

If it is not determined in Step S105 that the CleanUp SW has been operated, the process goes to Step S107. In Step S107, it is determined whether the 1st release SW, which is one of the camera-operating switches SW 152, has been operated. If the 1st release SW is ON, the process goes to Step S108. If the 1st release SW is OFF, the process returns to Step S101.

In Step S108, luminance information about the object is acquired from the photometry circuit 121. From this information, an exposure time (Tv value) and a diaphragm-opening value (Av value) are calculated for the imaging element 27 and the lens unit 12, respectively.

In Step S109, the data generated by the AF sensor unit 116 is acquired via the AF-sensor drive circuit 117. From this data, Bucom 150 computes the defocusing degree. In Step S110, it is determined whether the defocusing degree thus calculated falls within a tolerance range. If NO, the process goes to Step S111. In Step S111, the photographing lens is driven in the photographing optical system 12a. Then, the process returns to Step S101.

In Step S110 it may be determined that defocusing degree falls within a tolerance range. In this case, the process goes to Step S112. In Step S112, it is determined whether the 2nd release SW, which is one of the camera-operating switches SW 152, has been operated. If the 2nd release SW has been operated, the process goes to Step S314. If the 2nd release SW has not been operated, the process returns to Step S101.

In Step S113, the diaphragm opening is controlled for the photographing lens in the photographing optical system 12a, in accordance with the Av value calculated in Step S105. Then, in Step S114, the quick-return mirror 13b is driven to the Up-position.

In Step S115 to Step S117, a flag is set to permit dust shielding to be effected. If this flag, or dust-shielding permission flag, is cleared ("0"), it prohibits dust shielding. If it is set ("1"), it permits dust shielding. The dust-shielding permission flag is set when the shutter-opening time is long. This is because, the longer the shutter-opening time, the longer the dust filter 21 is exposed to external air, increasing the chance for the dust to stick to the dust filter 21 during the exposure operation.

If bulb photographing is selected, dust may stick to the dust filter 21 because the shutter 14 remains open while the user is pushing the release SW. In the bulb photographing, the shutter-opening time cannot be predicted (or the camera cannot predicts the very exposure time that the user wants). It is therefore necessary to remove dust from the dust filter before the bulb photographing is performed.

In the present embodiment it may be determined whether dust should be removed, depending on the photographing mode that the user has selected, though it is not described here how the decision is made. This is because the user may select a photographing mode in which the shutter should remain open for a long time (e.g., mode of photographing scenery at night).

First, in Step S115 it is determined whether the shutter-opening time is longer than a preset time. If the shutter-opening time is longer than the preset time, the process goes to Step S117. If the shutter-opening time is equal to or shorter than the preset time, the process goes to Step S116 to clear the dust-shielding permission flag.

In Step S115, it is also determined whether the bulb photographing has been selected. If the bulb photographing has been selected, Step S117 is performed to set the dust-shielding permission flag. If the bulb photographing has not been selected, Step S116 is carried out to clear the dust-shielding permission flag. Then, the process goes from Step S116 or Step S117 to Step S118.

In Step S118, the shutter 14 is opened. In Step S119, a subroutine "photographing operation" is carried out. The subroutine "photographing operation" will be explained later in detail. In Step S120, the shutter 14 is closed. In Step S121, the quick-return mirror 13b is driven to the Down-position. Further, in Step S122, the shutter 14 is charged. In Step S123, the diaphragm for the photographing lens is driven to the open position in the photographing optical system 12a. In Step S124, the image data generated by the imaging element 27 is converted to one in a prescribed format. The image data thus converted is stored in the recording medium.

Figures 22, 26:
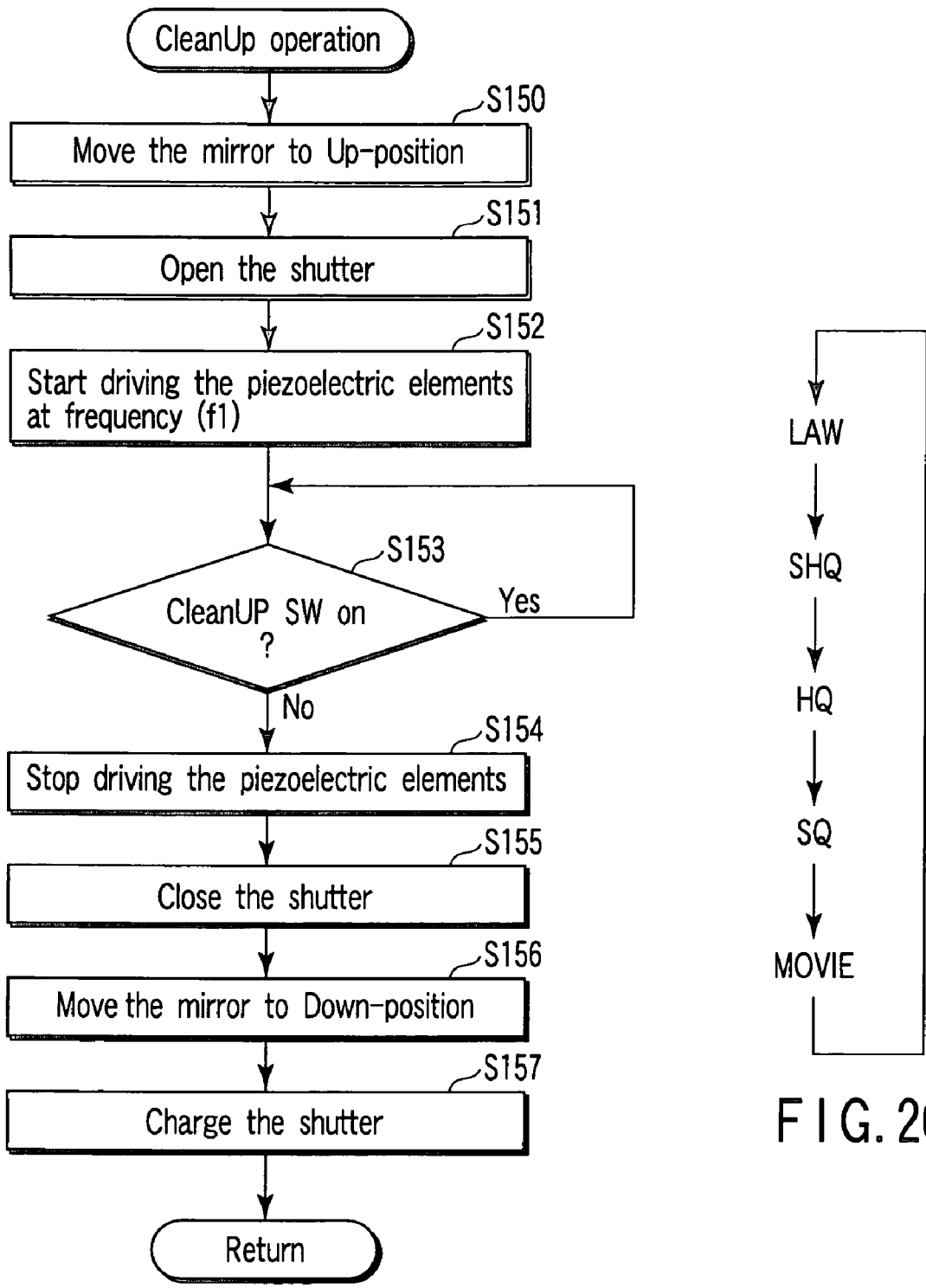
FIG. 22 is a diagram illustrating, in detail, the subroutine, or "CleanUp operation" (Step S106) described with reference to FIG. 21.
FIG. 26 is a diagram depicting how the image-quality mode information changes every time the image-quality-mode selecting SW is operated.

FIG. 22 is a diagram illustrating, in detail, the subroutine, or "CleanUp operation" (Step S106) described with reference to FIG. 21. When the user turns on the CleanUp SW, this subroutine is executed. The camera automatically performs dust shielding, as is needed. The dust shielding may be performed not only automatically, but also at the user's will. Then, the camera will be user-friendlier.

In the process of manufacturing the camera, the camera must be tested for its operating reliability. It is demanded that the dust shielding should be manually effected in the test. To meet the demand, this subroutine is executed. In this subroutine, the quick-return mirror 13b is fixed in the Up-position and the shutter 14 is opened. Hence, the user can observe the surface condition of the dust filter 21 that is vibrating. If large dust particles are found on the dust filter 21, it is not desirable to let the dust particles fall into the gap between the dust filter 21 and the shutter 14. In this subroutine, the dust shielding can be effected in order to remove the dust out of the camera.

First, in Step S150, the quick-return mirror 13b is moved to the Up-position. In Step S151, the shutter 14 is opened. In Step S152, two piezoelectric elements 22 are made to start operating at frequency f1. The dust filter 21 is thereby vibrated in such a way as is illustrated in FIG. 7 and FIG. 8.

In Step S153, the state of the CleanUp SW is detected. Step S153 is repeated until the CleanUp SW is turned off. As long as the CleanUp SW remains ON, the dust filter 21 keeps vibrating. The user needs only to hold the CleanUp SW on for a time required. When the CleanUp SW is turned off, the process goes to Step S154. In Step S154, the piezoelectric elements 22 provided on the dust filter 21 are stopped. Thereafter, the process goes to Step S155.

In Step S155, the shutter 14 is closed. In Step S156, the quick-return mirror 13b is driven to the Down-position. In Step S157, the shutter 14 is charged. Then, the process returns.

Figure 23:
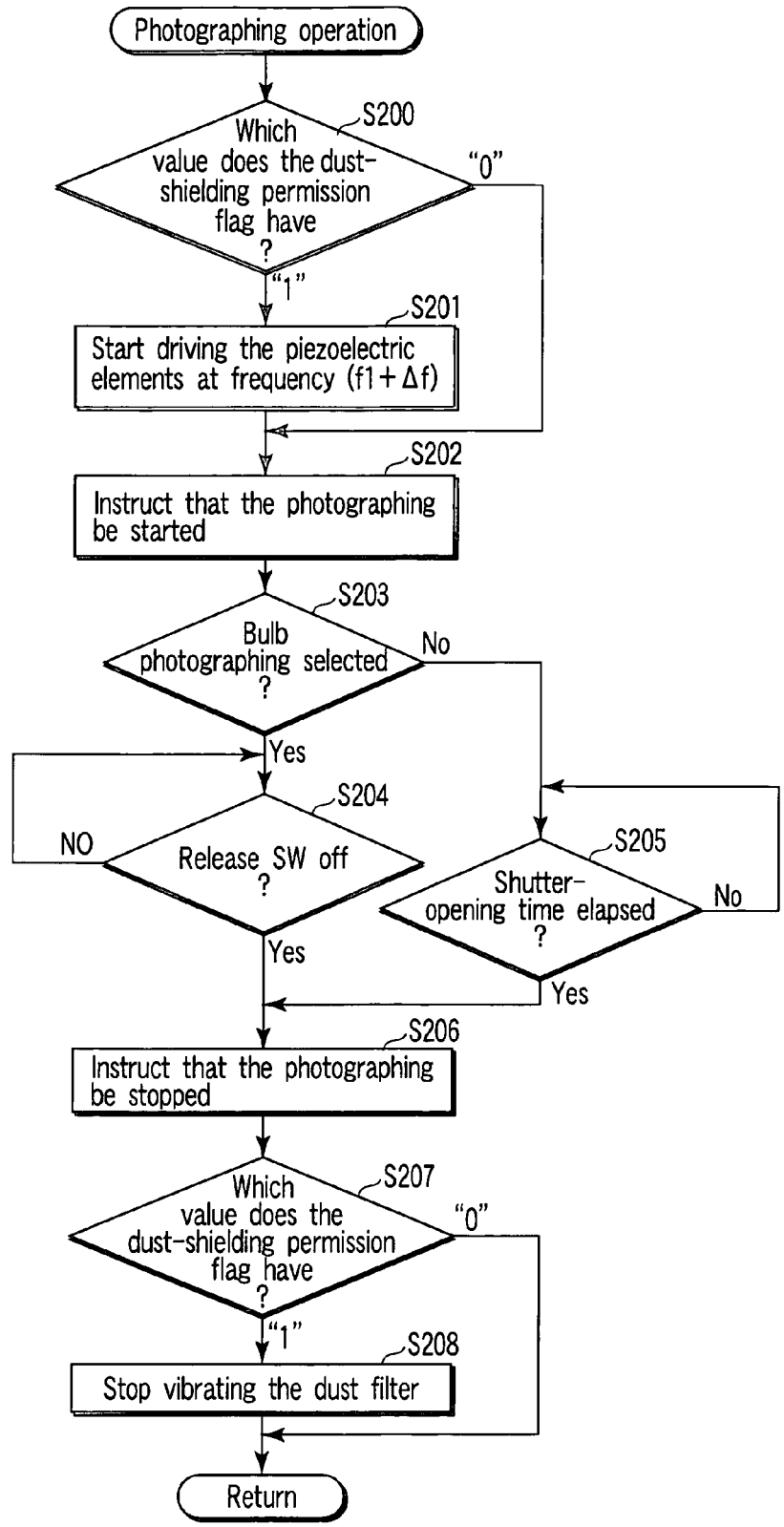
FIG. 23 is a diagram illustrating, in detail, the subroutine, or "imaging operation" (Step S119) described with reference to FIG. 21.

FIG. 23 is a diagram illustrating, in detail, the subroutine, or "Imaging operation" (Step S119) described with reference to FIG. 21. In Step S200, the state of the dust-shielding permission flag is determined. If the dust-shielding permission flag is "1," the process goes to Step S201. If the dust-shielding permission flag is "0," the process goes to Step S202. In Step S201, a drive signal of frequency (f1+Δf) is supplied to the piezoelectric elements 22. Note that f1 is the resonance frequency of primary vibration and that Δf is a deviation from the frequency f1.

The resonance frequency f1 is determined by the shape of the dust filter 21. When the dust filter 21 is driven at the resonance frequency f, it acquires the maximum amplitude as is illustrated in FIG. 16. The greater the amplitude of the dust filter 21, the greater the efficiency of removing dust from the filter 21. At the resonance frequency f1, however, the impedance of the piezoelectric elements 22 decreases. This inevitably increases the power required to drive the dust filter 21. If the dust filter 21 deforms greatly, the aberration caused by the dust filter will increase, possibly degrading the image quality.

In view of this, the drive frequency at which to drive the dust filter during the photographing operation is deviated from the resonance frequency f1 in the present embodiment. The data representing the deviation (Δf) is stored in the nonvolatile memory 129. If the dust filter 21 is driven at any frequency other than the resonance frequency f1, its amplitude will decrease. Nonetheless, the decrease in the amplitude, if small, will make no great problem, because the filter 21 is vibrated not to remove dust from it, but to prevent dust from sticking to it.

In the next step, Step S202, the image process controller 128 is instructed to start the imaging operation. In Step S203, it is determined whether a bulb photographing is proceeding. If a bulb photographing is proceeding, the process goes to Step S204. Step S204 is repeated until the release SW is turned off. When the release SW is turned off, the process goes to Step S206.

If it is determined in Step S203 that the bulb photographing is not proceeding, the process goes from Step S203 to Step S205. In Step S205, the timer counter is driven and no operation is performed until the shutter-opening time determined in Step S108 elapses. Upon elapse of the shutter-opening time, the process goes to Step S206.

In Step S206, a photographing-stop instruction is sent to the image process controller 128. In Step S207, the state of the dust-shielding permission flag is determined. If the dust-shielding permission flag is "1," the dust filter 21 is made to stop vibrating, and the process returns to the main routine. If the dust-shielding permission flag is "0," the process immediately returns to the man routine.

The seventh embodiment described above is a camera system in which the dust filter is vibrated to remove dust from it. In this camera system, the dust filter 21 is vibrated at its resonance frequency when the photographing lens is exchanged or when the CleanUp SW is operated. When photographing is performed by setting a long exposure time or by using a flash bulb, the dust filter 21 is vibrated at frequency (f1+Δf) that is deviated by Δf from the resonance frequency f1. Hence, the camera system makes an electronic imager apparatus which can provide high-quality images and which does not waste electric power.

EIGHTH EMBODIMENT

Figure 24:
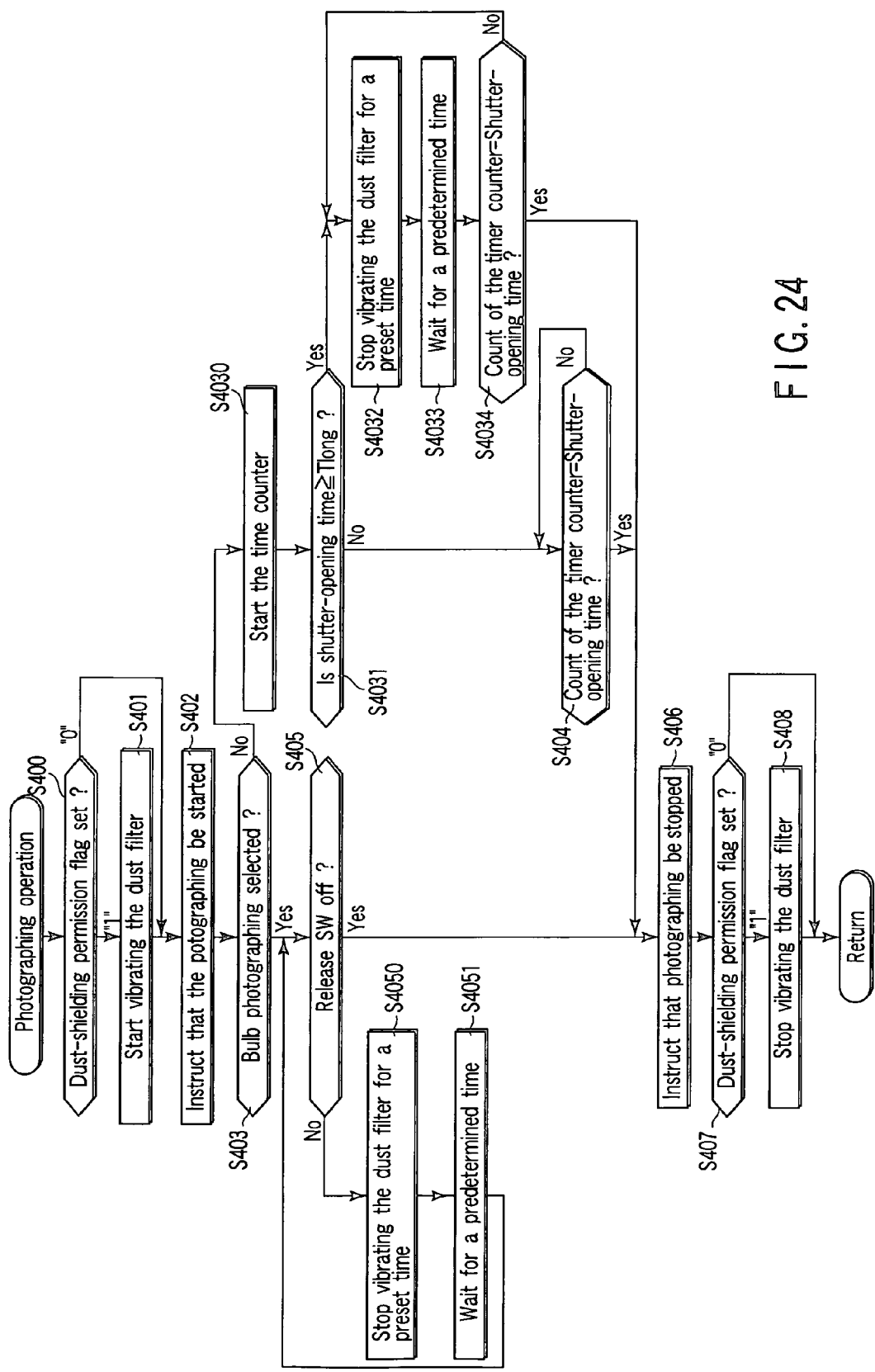
FIG. 24 is a flowchart explaining how Bucom 150 operates in a camera system according to an eighth embodiment of this invention.

FIG. 24 is a flowchart explaining how Bucom 150 operates in a camera system according to an eighth embodiment of this invention. The eighth embodiment is characterized in that the dust filer 21 is intermittently driven in the subroutine "imaging operation" (Step S119 shown in FIG. 21). In any other respect, the eighth embodiment is the same as the first embodiment.

First, in Step S400, the state of the dust-shielding permission flag is determined. If the dust-shielding permission flag is "1," the process goes to Step S401 to start vibrating the dust filter 21. In Step S401, a predetermined drive signal is supplied to the piezoelectric elements 22 to vibrate the dust filter 21. Then, the process goes to Step S402.

If the dust-shielding permission flag is "0," the process immediately goes to Step S402. In Step S402, an instruction is given to the image process controller 128, making the controller 128 start a photographing operation. In Step S403, it is determined whether a bulb photographing is proceeding or not. If a bulb photographing is proceeding, the process goes to Step S405. In Step S405, the state of the release SW is detected. If it is detected that the release SW is OFF, the process goes to Step S406. If it is detected that the release SW is ON, the process goes to Step S4050. In Step S4050, the vibration of the dust filer 21 is suspended for a prescribed time. Upon lapse of the prescribed time, the vibration is resumed. In Step S4051, the vibration is continued until a predetermined time expires.

Step S4050 and Step S4051 are performed, intermittently removing dust during the bulb photographing operation. The bulb photographing is carried out to photograph low-luminance objects such as heavenly bodies. In some cases, the exposure time is very long and the electric power for dust shielding must be saved as much as possible. In order to save power, the dust filter 21 is intermittently driven.

If it is determined in Step S403 that no bulb photographing is proceeding, the process goes to Step S4030. In Step S4030, the time counter starts operating to measure the exposure time. In Step S4031, it is determined whether the shutter-opening time is equal to or longer than a preset time (Tlong). If it is equal to or longer than Tlong, the process goes to Step S4032. In Step S4032, the vibration is suspended for a prescribed time. Upon lapse of the prescribed time, the vibration is resumed. Then, in Step S4033, the dust shielding is continued for a preset time. In Step S3404, it is determined whether the timer counter has finished counting the shutter-opening time. If the shutter-opening time has been counted, the process goes to Step S406. If the shutter-opening time has not been counted, the process goes to Step 3402.

If the shutter-opening time is shorter than Tlong, the timer counter counts time until its count reaches the shutter-opening time. Then, the process goes to Step S406. The dust shielding is intermittently performed not only during the bulb photographing, but also during any other type of photographing that involves a long exposure time in order to save power required for dust shielding, as in bulb photographing.

In Step S406, a photographing-stop instruction is sent to the image process controller 128. In Step S407, the state of the dust-shielding permission flag is determined. If the dust-shielding permission flag is "1," the dust filter 21 is made to stop vibrating in Step S408, and the process returns to the main routine. If the dust-shielding permission flag is "0," the process immediately returns to the man routine.

The eighth embodiment described above is a camera system in which the dust filter 21 is vibrated to remove dust from it. When the photographing lens is exchanged or the CleanUp SW is operated, the dust filter 21 is vibrated at its resonance frequency. Moreover, when photographing is performed by setting a long exposure time or by using a flash bulb, the dust filter 21 is vibrated intermittently. Thus, the camera system makes an electronic imager apparatus which can provide high-quality images and which does not waste electric power.

NINTH EMBODIMENT

Figure 25:
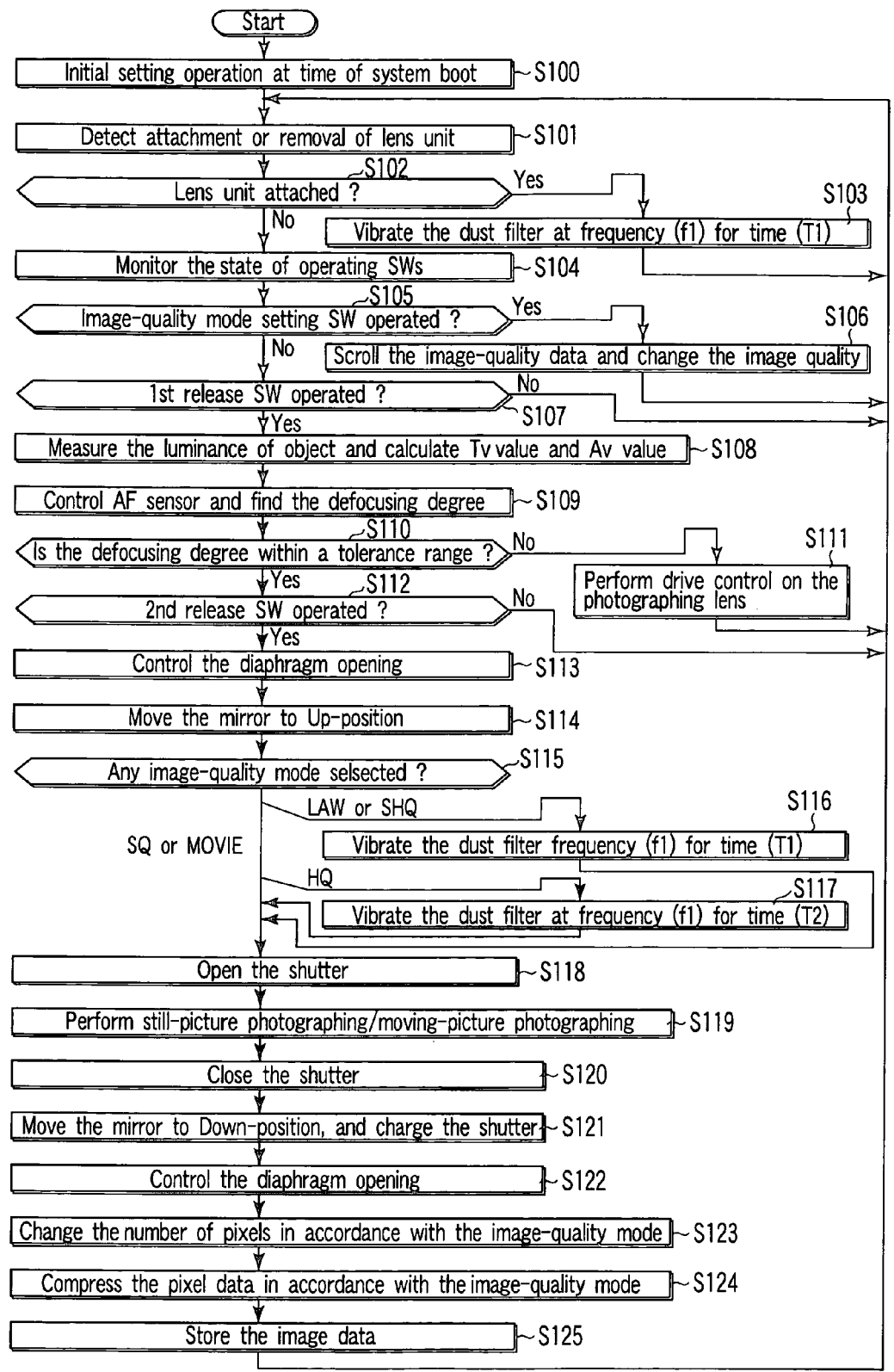
FIG. 25 is a flowchart explaining how Bucom 150 operates in a camera system according to a ninth embodiment of the invention.

FIG. 25 is a flowchart explaining how Bucom 150 operates in a camera system according to a ninth embodiment of the invention.

Bucom 150 starts operating when the user operates the power-supply SW on the camera is turned on. In Step S100, a process of booting the camera system is carried out. The power-supply circuit 153 is controlled, supplying power to the circuit units of the camera system. Also, the circuit units are initialized.

Step S101 is performed to detect that the lens unit 12 is attached to the camera body 11. More specifically, Bucom 150 periodically communicates with Lucom 205 to determine whether the lens unit has been attached to the camera body. If it is determined that the lens unit 12 has been attached to the camera body 11, the process goes from Step S102 to Step S103. The dust shielding is effected. In Step S103, the piezoelectric elements 22 mounted on the dust filter 21 are driven at frequency f1 for period T1.

The nonvolatile memory 129 stores the count value to be set in the N-scale counter, which is used to make the dust filter 21 undergo primary vibration at the resonance frequency (f1). The nonvolatile memory 129 also stores the data representing a period (T1) of vibrating the dust filter 21 to remove dust therefrom. The dust shielding is performed in accordance with these data items. When the lens unit 12 is exchanged, the camera mount is exposed outside and air flows into the mirror box. At this time, dust sticks to the dust filter 21. Therefore, the drive time (T1) should be sufficiently long. The process returns from Step S103 to Step S101.

In Step S102 it may not be determined that the lens unit 12 has been attached to the camera body 11. If so, the process goes from Step S102 to Step S104. In Step S104, the camera-operating switches SW 152 are periodically monitored. In Step S105 it is determined whether the image-quality-mode selecting SW, which is one of the camera-operating switches SW 152, has been operated. If it is determined that the image-quality-mode selecting SW has been operated, the process goes from Step S105 to Step S106.

In Step S106, the user can select one of four image-quality modes can be selected and the moving-picture photographing mode, by operating the image-quality-mode selecting SW. The four image-quality modes shall be called LAW, SHQ, HQ and SQ, and the moving-picture photographing mode shall be called MOVIE.

In LAW mode, the image data read from the imaging element 27 is recorded without being changed in the number of pixels or being compressed. This means that a greater amount of data is recorded in LAW mode than in any other image-quality mode.

In SHQ mode or HQ mode, the image data can be recorded without reducing the number of pixels which the data represents which corresponds to all pixels the imaging element 27 has. These modes differ in terms of data-compression ratio. In SHQ mode, image data that is about one-third ($\frac{1}{3}$) of the original amount is recorded. In HQ mode, image data that is about one-eighth ($\frac{1}{8}$) of the original amount is recorded. Due to this difference in compression ratio, the image represented by the data recorded in SHQ mode is better in quality than the image represented by the data recorded in HQ mode. In SQ mode, the image data is first reduced in the number of pixels by means of pixel-number conversion and is then compressed. Hence, LAW mode provides an image of the highest quality, SHQ mode an image of the second highest quality, HQ mode an image of the third highest quality, and SQ mode an image of the lowest quality. The image data items obtained in LAW, SHQ, HQ and SQ are in descending order in terms of amount.

In the MOVIE mode, the data involved is of a great amount if it is not processed at all. Thus, the number of pixels is decreased much more than in the data that represents a still picture. The moving picture is far lower in quality than a picture obtained in the still-picture photographing mode.

Every time the image-quality-mode selecting SW is operated, the image-quality mode is switched from one to another, as is shown in FIG. 26. Assume that SHQ mode has been set. When the user operates the image-quality-mode selecting SW in this condition, HQ mode is set as image-quality mode. After Step S106 is performed, the process returns to Step S101.

If it is determined in Step S105 that the image-quality-mode selecting SW has not been operated, the process immediately goes to Step S107. In Step S107, it is determined whether the 1st release SW, which is one of the camera-operating switches SW 152, has been operated. If the 1st release SW has been operated, the process goes to Step S108. If NO, the process returns to Step S101.

In Step S108, luminance information about the object is acquired from the photometry circuit 121. From this information, an exposure time (Tv value) and a diaphragm-opening value (Av value) are calculated for the imaging element 27 and the lens unit 12, respectively.

In Step S109, the data generated by the AF sensor unit 116 is acquired via the AF-sensor drive circuit 117. From this data, Bucom 150 computes the defocusing degree.

In Step S110, it is determined whether the defocusing degree thus calculated falls within a tolerance range. If NO, the process goes to Step S111. In Step S111, the drive control is performed on the photographing lens in the photographing optical system 12a. Then, the process returns to Step S101.

If it is determined in Step S110 that the defocusing degree thus calculated falls within the tolerance range, the process goes to Step S112. In Step S112, it is determined whether the 2nd release SW, which is one of the camera-operating switches SW 152, has been operated. If the 2nd release SW has been operated, the process goes to Step S113. If the 2nd release SW has not been operated, the process returns to Step S101.

In Step S113, the diaphragm opening is controlled for the photographing lens in the photographing optical system 12a, in accordance with the Av value calculated in Step S105. Then, in Step S114, the quick-return mirror 13b is driven to the Up-position. Once the quick-return mirror 13b has been so driven, air is stirred in the mirror box. Therefore, it is quite probable that dust sticks to the dust filter 21. Dust shielding is therefore performed after the mirror has been moved to the Up-position.

In Step S115, it is determined which mode has been set from image-quality information. If the image-quality information represents LAW mode or SHQ mode, the process goes from Step S115 to Step S116.

In LAW mode or SHQ mode, an image of high quality should be provided. Dust cannot be left on the dust filter 21. Dust, if any, must be reliably removed from the dust filter 21. Hence, dust shielding is effected in Step S116 in the same conditions as in Step S103. Then, the process goes to Step S118.

If it is determined in Step S115 that HQ mode is set as image-quality mode, the process goes from Step S115 to Step S117. In Step S117, the dust filter 21 is vibrated at the frequency (f1) for a preset time (T2). The frequency is the same as in Step S116, but the time of driving the filter 21 is different. In HQ mode, the image quality is lower than in LAW mode or SHQ mode. In view of this, the dust shielding need not be effected to the same degree as in LAW or SHQ mode. Thus, it suffices to drive the dust filter 21 for a short time. That is, T1 >T2. The short filter-driving time helps to decrease the power consumption and the release-time lag. The data representing this filter-driving time is stored in the nonvolatile memory 129. After Step S117 is performed, the process goes to Step S118.

If it is determined in Step S115 that SQ mode or MOVIE mode has been set as image-quality information, the process immediately goes from Step S115 to Step S118.

In Step S118, the shutter 14 is opened. In Step S119, the imaging element 27 is exposed to light on the basis of the Tv value calculated in Step S108. If the moving-picture photographing mode has been selected, the moving-picture data is acquired from the imaging element 27 for a predetermined time. In Step S120, the shutter 14 is closed. In Step S121, the quick-return mirror 13b is driven to the Down-position, and the shutter 14 is charged. In Step S122, the diaphragm opening is controlled for the photographing lens in the photographing optical system 12a. In Step S123, the data read from the imaging element 27 is changed in number of pixels, in accordance with the image-quality mode. In Step S124, the image data is compressed in accordance with the image-quality mode.

In Step S125, the image data thus obtained is stored in the recording medium 127.

The ninth embodiment described above can provide an electronic imager apparatus in which dust shielding can be effected in such a way as appropriate to the image quality selected.

Additional advantages and modifications will readily occur to those skilled in the art. Therefore, the invention in its broader aspects is not limited to the specific details and representative embodiments shown and described herein. Accordingly, various modifications may be made without departing from the sprint or scope of the general inventive concept as defined by the appended claims and their equivalents.

What is claimed is:

1. An imager apparatus in which an optical member protecting an imaging element is vibrated to remove dust from the optical member, said apparatus comprising:
    a vibration member which vibrates the optical member for a predetermined time;
    a photographing-mode setting unit which sets a photographing mode; and
    a vibration-time setting unit which sets, when the photographing-mode setting unit sets the photographing mode to a continuous photographing mode, a first time as the predetermined time for a first photographing operation, and a second time as the predetermined time for each of subsequent photographing operations from a second photographing operation onward,
    wherein the vibration-time setting unit sets the first time to time longer than the second time.

2. An imager apparatus in which an optical member protecting an imaging element is vibrated to remove dust from the optical member, said apparatus comprising:
    a vibration member which vibrates the optical member;
    a photographing-mode setting unit which sets a photographing mode; and
    an operation-prohibiting unit which prohibits the vibration member from operating, in accordance with the photographing mode set by the photographing-mode setting unit,
    wherein when the photographing-mode setting unit selects a single-shot photographing mode, the operation-prohibiting unit permits the vibration member to operate each time a photographing operation is performed, and when the photographing-mode setting unit selects a continuous photographing mode, the operation-prohibiting unit permits the operation-prohibiting unit to operate only at a first photographing, and prohibits the vibration member from operating at subsequent photographing from a second photographing onward.

* * * * *